US008139660B2

(12) United States Patent
Anigstein et al.

(10) Patent No.: US 8,139,660 B2
(45) Date of Patent: Mar. 20, 2012

(54) METHODS AND APPARATUS RELATED TO USING A WIRELESS TERMINAL SCRAMBLING IDENTIFIER

(75) Inventors: Pablo Anigstein, Gillette, NJ (US); Prashanth Hande, Jersey City, NJ (US); Junyi Li, Bedminster, NJ (US); Rajiv Laroia, Far Hills, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1398 days.

(21) Appl. No.: 11/486,609

(22) Filed: Jul. 14, 2006

(65) Prior Publication Data

US 2007/0242764 A1 Oct. 18, 2007

Related U.S. Application Data

(60) Provisional application No. 60/792,223, filed on Apr. 14, 2006, provisional application No. 60/792,021, filed on Apr. 14, 2006.

(51) Int. Cl.
*H04K 1/10* (2006.01)
(52) U.S. Cl. .......... 375/260; 375/295; 375/280; 455/61; 455/102; 455/561; 370/312; 370/349; 370/432; 370/471
(58) Field of Classification Search .................. 375/260, 375/295, 280; 455/61, 102, 561; 370/312, 370/349, 432, 471
See application file for complete search history.

(56) References Cited

U.S. PATENT DOCUMENTS

| 6,496,543 | B1 * | 12/2002 | Zehavi ........................... 375/295 |
| 6,724,813 | B1 * | 4/2004 | Jamal et al. ................... 375/219 |
| 7,386,058 | B2 * | 6/2008 | Fujii ............................ 375/267 |
| 7,536,013 | B2 * | 5/2009 | Dick et al. ..................... 380/210 |
| 7,586,834 | B2 * | 9/2009 | Byun et al. .................... 370/208 |
| 2002/0138804 | A1 * | 9/2002 | Sangha et al. ................ 714/758 |

(Continued)

FOREIGN PATENT DOCUMENTS

EP 0565506 10/1993

(Continued)

OTHER PUBLICATIONS

International Search Report ISA EPO PCT/US2007/066650 Sep. 25, 2007.

(Continued)

*Primary Examiner* — Khanh C Tran
*Assistant Examiner* — Rahel Guarino
(74) *Attorney, Agent, or Firm* — Kenneth Vu

(57) ABSTRACT

User specific modulation-symbol scrambling is implemented for various uplink segments, e.g., uplink traffic acknowledgement channel (ULTACH), uplink state request channel (UL-SRCH), and uplink dedicated control channel (ULDCCH) segments. A wireless terminal is assigned a wireless terminal scrambling identifier. A set of ordered input modulation symbols are determined for an uplink dedicated segment to which user specific scrambling is to be applied. One bit of the assigned wireless terminal scrambling identifier is associated with each of the ordered input modulation symbols of a segment in accordance with a predetermined mapping. For each input modulation symbol a scrambling operation, e.g., a phase rotation of the input modulation symbol, is performed as a function of the associated user specific scrambling identifier bit to obtain a corresponding output modulation symbol. A value of (0,1) for a scrambling ID bit is associated with a (first, second) amount of phase rotation, e.g., (0, 180) degrees, respectively.

51 Claims, 20 Drawing Sheets

U.S. PATENT DOCUMENTS

| | | | |
|---|---|---|---|
| 2003/0128787 A1* | 7/2003 | Terasawa et al. | 375/367 |
| 2003/0142622 A1* | 7/2003 | Kaku et al. | 370/208 |
| 2004/0057401 A1* | 3/2004 | Dick et al. | 370/329 |
| 2004/0095904 A1* | 5/2004 | Laroia et al. | 370/329 |
| 2004/0264412 A1* | 12/2004 | Arimitsu | 370/331 |
| 2005/0195885 A1* | 9/2005 | Misra et al. | 375/130 |
| 2006/0187887 A1* | 8/2006 | Kim et al. | 370/335 |

FOREIGN PATENT DOCUMENTS

| | | |
|---|---|---|
| EP | 1146762 | 10/2001 |
| JP | 8228180 A | 9/1996 |
| WO | 9949695 | 9/1999 |
| WO | WO2004075023 | 9/2004 |

OTHER PUBLICATIONS

Pil Kwan Kim et al: "An OFDM-CDMA scheme using orthogonal code multiplexing and its parallel interference cancellation receiver" Spread Spectrum Techniques and Applications, 2002 IEEE Seventh International Symposium on Sep. 2-5, 2002, Piscataway, NJ, USA, IEEE, vol. 2, Sep. 2, 2002, pp. 368-372, XP010615493, ISBN: 0-7803-7627-7.

Written Opinion—PCT/US2007/066650, International Search Authority, European Patent Office, Sep. 25, 2007.

* cited by examiner

FIGURE 4

Table 400 — wtScramblingID:

| BIT $Z_{15}$ (MSB) | BIT $Z_{14}$ | BIT $Z_{13}$ | BIT $Z_{12}$ | BIT $Z_{11}$ | BIT $Z_{10}$ | BIT $Z_9$ | BIT $Z_8$ | BIT $Z_7$ | BIT $Z_6$ | BIT $Z_5$ | BIT $Z_4$ | BIT $Z_3$ | BIT $Z_2$ | BIT $Z_1$ | BIT $Z_0$ (LSB) |
|---|---|---|---|---|---|---|---|---|---|---|---|---|---|---|---|

402 — WT A CURRENT wtScramblingID CORRESPONDING TO A FIRST BASE STATION SECTOR CONNECTION:

| 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|

404 — WT A CURRENT wtScramblingID CORRESPONDING TO A SECOND BASE STATION SECTOR CONNECTION:

| 0 | 0 | 0 | 0 | 0 | 1 | 1 | 1 | 0 | 0 | 0 | 0 | 0 | 0 | 0 | 1 |
|---|---|---|---|---|---|---|---|---|---|---|---|---|---|---|---|

406 — WT B CURRENT wtScramblingID CORRESPONDING TO A BASE STATION SECTOR CONNECTION:

| 1 | 0 | 1 | 1 | 0 | 0 | 1 | 0 | 0 | 0 | 1 | 0 | 0 | 1 | 1 | 1 |
|---|---|---|---|---|---|---|---|---|---|---|---|---|---|---|---|

| FIGURE 18A |
|---|
| FIGURE 18B |

# METHODS AND APPARATUS RELATED TO USING A WIRELESS TERMINAL SCRAMBLING IDENTIFIER

RELATED APPLICATIONS

The present application claims the benefit of the filing date of U.S. Provisional Patent Application Ser. Nos. 60/792,223 and 60/792,021 both filed on Apr. 14, 2006 titled "METHODS AND APPARATUS RELATED TO USING A WIRELESS TERMINAL SCRAMBLING IDENTIFIER".

FIELD OF THE INVENTION

This invention relates to multi-user communications systems and, more particularly, to methods and apparatus used to mitigate the effect of one or more users in such a system wrongly assuming the same identity as a genuine user.

BACKGROUND

Communications systems frequently include a plurality of network nodes that are coupled to base stations, e.g., access nodes, through which end nodes, e.g., mobile devices, are coupled to the network.

The end nodes, referred to as wireless terminals, are typically granted identification numbers when they are actively communicating with the access nodes. These granted identification numbers are sometimes referred to as active identification numbers. In a non-orthogonal system, when each of the active users transmits their signal, whether communicating control information or actual traffic, the active users create interference to one another. In an orthogonal system, interference between active users transmitting to the same access node is theoretically prevented by allocating, e.g., partitioning, uplink channel resources, among the various active users. The allocated resources include resources used to communicate control information and resources used to communicate traffic, e.g., user data. The allocation is based on the identification numbers of the active wireless terminals and can be either according to a fixed pattern or based on information about the allocation received during the communication process. In either case using this approach, a given channel resource is allocated to at most one active identification number, letting the wireless terminal with that active identification number use the channel resource for transmission.

In such a system, it is possible that occasionally a wireless terminal assumes a wrong active identification number, possibly due to uncorrected errors in the information bits that convey the identification number or due to faulty operation of the wireless terminal or the access node. Irrespective of the reason why the wireless terminal assumes a wrong identification number, this situation can result in the wireless terminal transmitting a signal on a channel resource that has not really been allocated to it. This results in added interference to uplink signal from the wireless terminal to which the wrongly assumed identification number really belongs thus hampering the communication process of that wireless terminal.

In view of the above discussion, it should be appreciated that there is a need for new and improved ways of mitigating the effects of a situation where one or more wireless terminals in the system have wrongly assumed active identification numbers thereby hampering the communication process of wireless terminals to whom the active identification numbers genuinely belong to.

SUMMARY

Various embodiments are directed to methods and apparatus for mitigating the effects of a situation where one or more wireless terminals accessing the same access node assume a wrong active identifier thereby hampering the communication process of the wireless terminal to whom the active identification number genuinely belongs.

In accordance with various embodiments, wireless terminals use a wireless terminal scrambling identifier (wtScramblingId) to scramble the modulation symbols that they transmit in at least some of the channel resources that is assumed to be allocated based on the active identifier (actid) of the wireless terminal. The wtScramblingId of a wireless terminal is, in some embodiments, a unique identifier of the wireless terminal that is known both to the wireless terminal as well as the access node. In some such systems, the derivation of the wtScramblingId and the process of communicating the wtScramblingId between the wireless terminal and the access node can follow a variety of possible methods as long as the end result is a unique identifier of the wireless terminal known both to the wireless terminal and the access node.

In one but not necessarily all embodiments, the scrambling can be based on a wtScramblingId that is limited in the number of bits used to represent the identifier on both the access node and the wireless terminal. In this case, the uniqueness of the wtScramblingId does not necessarily apply, particularly if the number of wireless terminals in the system is larger than the largest number that can be used to represent the identifier with the given number of bits. However, the mitigating effect of the scrambling process still applies since the possibility of two wireless terminals sharing a non-unique wtScramblingId also colliding on the same actId is remote.

In accordance with some but not necessarily all embodiments, the scrambling method involves the following. The information bits to be transmitted are subjected to encoding and modulation to generate encoded modulation symbols. The encoded modulation symbols that are to be scrambled and transmitted in a given channel resource are ordered as most significant to least significant. The wtScramblingId is grouped into N bits starting from either the most significant bit or the least significant bit. Each group of N bits determines one of a plurality of different phase rotations that can be applied to a modulation symbol. The plurality of the phase rotations that can be determined by N bits is up to $2^N$. The groups of N bits can be subjected to a predetermined permutation that is known both to the wireless terminal and the access node and ordered as most significant to least significant. The most significant modulation symbol is subjected to an amount of phase rotation determined by the most significant group resulting in the first scrambled modulation symbol. The second most significant modulation symbol is then subjected to an amount of phase rotation determined by the second most significant modulation symbol resulting in the second scrambled modulation symbol and so on. This process is repeated until the least significant group of N bits have been used to determine the amount of phase rotation of a modulation symbol. The next modulation symbol is subjected to an amount of phase rotation determined again by the most significant group of N bits, the same group that was used to determine the phase rotation of the first modulation symbol. The process is repeated on modulation symbols until the set of modulation symbols to be scrambled, e.g., corresponding to a segment, have been subjected to an amount of phase rotation determined by a corresponding group of N bits resulting in a scrambled modulation symbol. The scrambled modulation symbols are then transmitted.

In some exemplary embodiments, the value of N is set to one so that the bits representing the wtScramblingId are considered 1 bit at a time. In some such embodiments, the amount of phase rotation that a modulation symbol will be subjected is one of 0° and 180° based on whether the corresponding bit determining the amount of phase rotation is 0 or 1.

In some exemplary embodiments, the wtScramblingId is represented by 16 bits, e.g., 16 bits of the wtScramblingId denoted by $Z_{15}, Z_{14}, \ldots, Z_0$. In such an embodiment, the bits can be ordered most significant to least significant according to their ordering in the binary representation of the wtScramblingId resulting in $Z_{15}$ representing the most significant bit and $Z_0$ the least significant bit.

In one embodiment, the scrambling is applied to modulation symbols that are transmitted in the channel resource that correspond to at least one of an uplink dedicated control channel, an uplink traffic acknowledgement channel, an uplink state transition acknowledgement channel, and an uplink state request channel.

In accordance with various embodiments, the wireless terminal apparatus includes a scrambling module that takes modulation symbols and wtScramblingId as input and generates the scrambled modulation symbols. In addition the wireless terminal apparatus includes a transmission module that transmits scrambled modulation symbols.

In one embodiment, the scrambling module includes a phase rotation module that subjects a plurality of modulation symbols on a symbol by symbol basis to a phase rotation operation where each phase rotation is by an amount determined by a corresponding group of N bits in the set of bits representing the wtScramblingId where N is a positive integer.

In one embodiment, N is set to one and the plurality of phase rotations that one bit can result in is fixed to 0° and 180°.

The methods and apparatus of various embodiments scramble encoded modulation symbols that are intended to be transmitted on a dedicated channel resource which has wrongly been assumed, by a wireless terminal, to have been allocated to the wireless terminal, when in fact the dedicated channel resource has been allocated to a different wireless terminal. The scrambling makes the scrambled modulation symbols from the wireless terminal erroneously transmitting into the resource appear equivalent to noise if at the receiving end on the access node, the scrambled symbols are not subjected to a phase rotation in opposition to what they were subjected to at the wireless terminal. The appearance of the scrambled modulation symbols, from a wireless terminal that has wrongly assumed its actid, as noise as opposed to appearing as encoded modulation symbols reduces the likelihood of the scrambled modulation symbols transmitted from a genuine wireless terminal from being wrongly decoded.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 4 describes exemplary wireless terminal scrambling identifiers in accordance with various embodiments.

DETAILED DESCRIPTION

Figure 1:
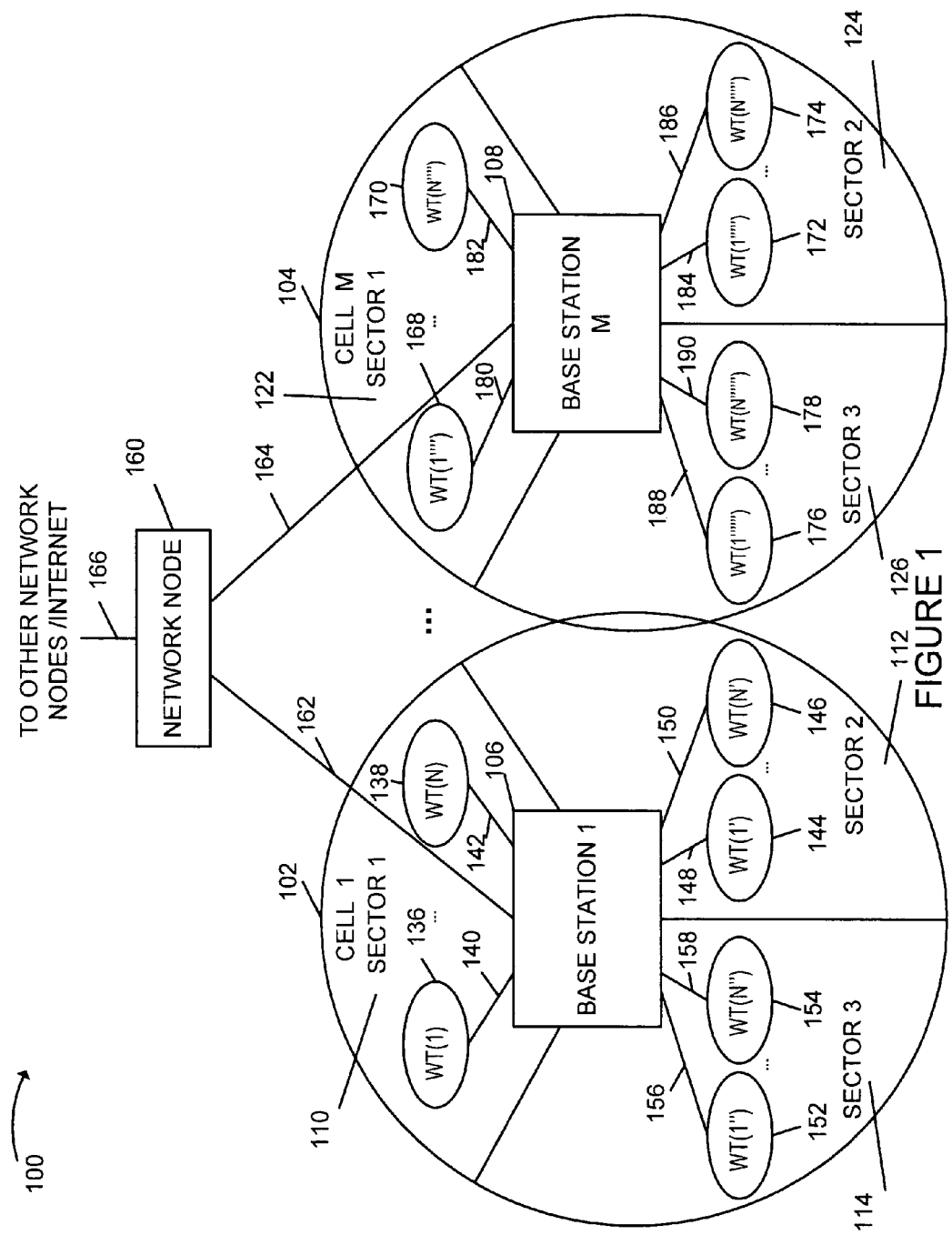
FIG. 1 is a drawing of an exemplary communication system implemented in accordance with various embodiments.

FIG. 1 shows an exemplary communication system 100 implemented in accordance with various embodiments. Exemplary communications system 100 includes multiple cells: cell 1 102, cell M 104. Exemplary system 100 is, e.g., an exemplary multiple access orthogonal frequency division multiplexing (OFDM) wireless communications system such as a multiple access OFDM spread spectrum system including tone hopping. Each cell 102, 104 of exemplary system 100 includes three sectors. Cells which have not been subdivided into multiple sectors (N=1), cells with two sectors (N=2) and cells with more than 3 sectors (N>3) are also possible in accordance with various embodiments. Each sector supports one or more carriers and/or downlink tones blocks. At least some of the downlink tone blocks have a corresponding uplink tone block. In some embodiments at least some of the sectors support three downlink/uplink tones block pairs. Each combination of a sector and tone block pair, for a base station, corresponds to a different base station sector attachment point. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 106 via wireless links 140, 142, respectively; sector 2 112 includes WT(1') 144 and WT(N') 146 coupled to BS 106 via wireless links 148, 150, respectively; sector 3 114 includes WT(1") 152 and WT(N") 154 coupled to BS 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT(1'''') 172 and WT(N'''') 174 coupled to BS M 108 via wireless links 184, 186, respectively; sector 3 126 includes WT(1''''') 176 and WT(N''''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, laptop computers with wireless modems, data terminals with wireless modems, etc.

Figure 2:
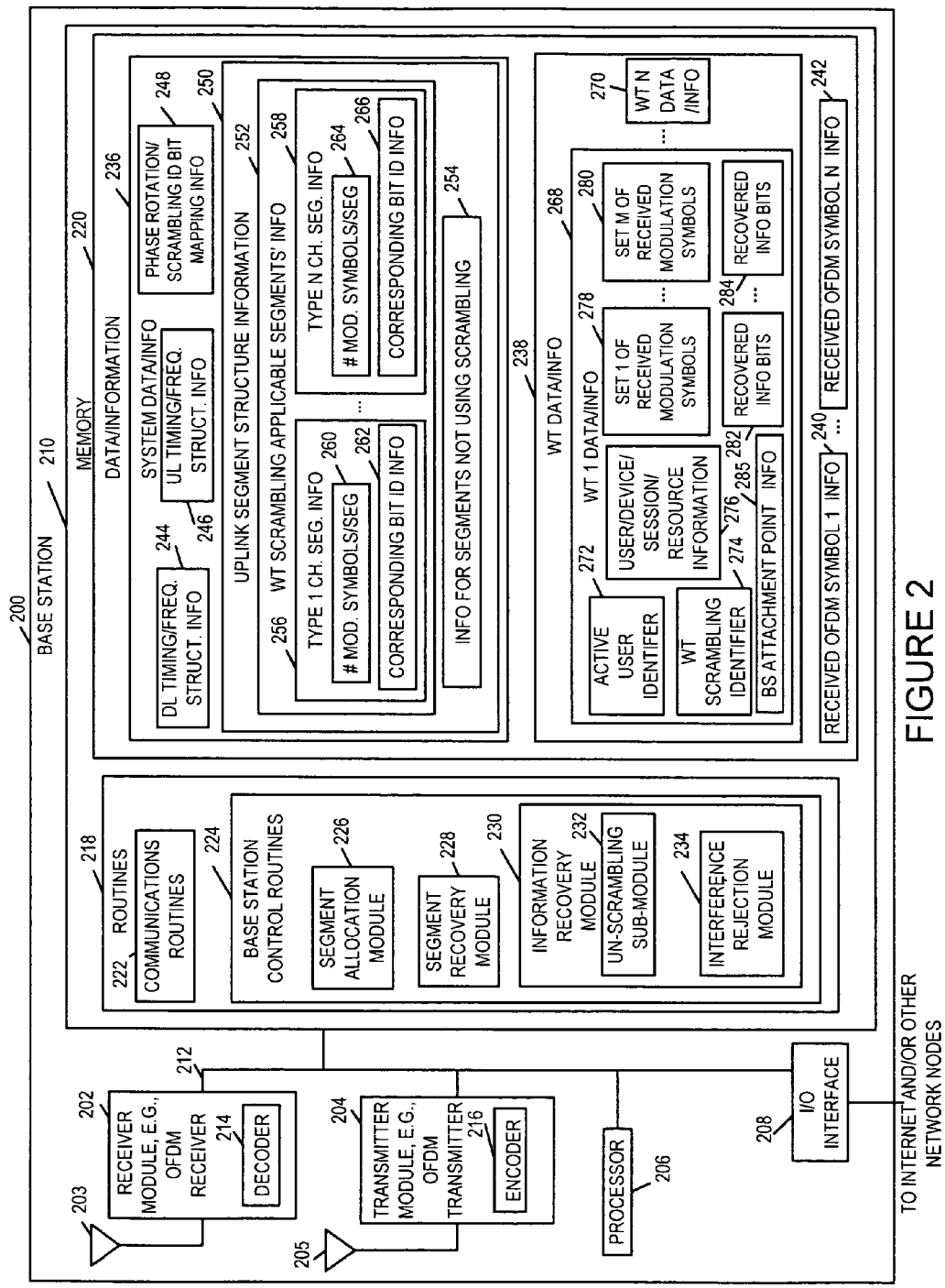
FIG. 2 is a drawing of an exemplary base station, e.g., access node, implemented in accordance with various embodiments.

FIG. 2 is a drawing of an exemplary base station (BS) 200, e.g., access node, implemented in accordance with various embodiments. Exemplary base station 200 may be any of the exemplary base stations (106, 108) of system 100 of FIG. 1. Exemplary base station 200 includes a receiver module 202, a transmitter module 204, a processor 206, I/O interface 208, and memory 210 coupled together via a bus 212 over which the various elements may interchange data and information. Memory 210 includes routines 218 and data/information 220. The processor 206, e.g., a CPU, executes the routines 218 and uses the data/information 220 in memory 210 to control the operation of the base station 200 and implement methods.

Receiver module 202, e.g., an OFDM receiver, is coupled to receive antenna 203 via which the base station 200 receives uplink signals from a plurality of wireless terminals. The OFDM receiver receives OFDM symbols, each received OFDM symbol including a plurality of modulation symbols, said plurality of modulation symbols being received from a plurality of wireless terminals. Receiver module 202 includes a decoder 214 decodes at least some of the received uplink signals.

Transmitter module 204, e.g., an OFDM transmitter, is coupled to a receive antenna 205 via which the base station 200 transmits downlink signals to wireless terminals. Transmitter module 204 includes an encoder 216 which encodes at least some of the downlink signals prior to transmission.

I/O interface 208 couples the base station 200 to the Internet and/or other network nodes, e.g., other base stations, router nodes, AAA nodes, home agent nodes, etc. I/O interface 208 couples the base station to a backhaul network including other base stations; thus a wireless terminal using base station 200 as its point of network attachment and another wireless terminal using a different base station as its point of network attachment can have a communications session.

Routines 218 include a communications routines 222 and base station control routines 224. The communications routines 222 implement the various communications protocols used by the base station 200. Base station control routines 224 include a segment allocation module 226, a segment recovery module 228, and an information recovery module 230. The information recovery module 230 includes an un-scrambling sub-module 232 and an interference rejection module 234.

Segment allocation module 226 allocates dedicated uplink segments to individual wireless terminals, a dedicated uplink segment being dedicated for one wireless terminal to use on a contention free basis. Allocation of a dedicated uplink segment to a wireless terminal may be by direct or indirect means. For example, a specific uplink segment may be allocated to a wireless terminal and communicated via an assignment message including an identifier associated with the wireless terminal. As another example, a WT may be assigned a base station assigned ON state identifier, the ON state identifier being associated with specific sets of dedicated control channel segments in a recurring uplink reporting structure. As another example, a wireless terminal may be assigned a downlink traffic channel segment via an assignment message including a wireless terminal identifier, and there may be a predetermined relationship between the downlink channel segment and a corresponding uplink traffic acknowledgement channel segment such that the base station and wireless terminal understand that the corresponding uplink traffic acknowledgement channel segment is being dedicated to the wireless terminal as a consequence of the downlink traffic channel segment being assigned to the wireless terminal.

Segment recovery module 228 associates sets of received modulation symbols with dedicated uplink segments in a recurring uplink channel structure being implemented by the base station 200. Information recovery module 230 processes at least some of the sets of received modulation symbols corresponding to dedicated uplink segments using wireless terminal scrambling identifiers. The unscrambling sub-module 232 performs an unscrambling operation, on a per modulation symbol basis, for received modulation symbols associated with a uplink segment which has been dedicated to an individual wireless terminal, as a function of a wireless terminal scrambling identifier associated with the segment. The unscrambling sub-module 232 applies, on a per modulation symbol basis, one of a plurality of different amounts of phase rotation, e.g., 0 degrees or 180 degrees of phase rotation. In this exemplary embodiment, the unscrambling sub-module 230 uses, for a received modulation symbol, a bit of a wireless terminal scrambling identifier, the bit having an indexed location in the wireless terminal scrambling identifier which corresponds, by a predetermined association, to an indexed modulation symbol location in the segment. In some other embodiments, multiple indexed bits of a wireless terminal scrambling identifier correspond to an indexed modulation symbol in an uplink segment dedicated to a wireless terminal.

Interference rejection module 234 uses a wireless terminal scrambling identifier associated with a segment to detect signals communicated via the segment from a wireless terminal to which the segment has been dedicated and which is using the wireless terminal scrambling identifier and to reject signals from any wireless terminal which erroneously transmits into the segment using another wireless terminal scrambling identifier, said another wireless terminal scrambling identifier being different from said wireless terminal scrambling identifier.

Data/information 220 includes system data/information 236, wireless terminal data/information 238, and a plurality of sets of information corresponding to received OFDM symbols (received OFDM symbol 1 information 240, . . . , received OFDM symbol N information 242). System data/information 236 includes downlink timing/frequency structure information 244, uplink timing/frequency structure information 246, phase rotation/scrambling identification bit mapping information 248, and uplink segment structure information 250. The uplink segment structure information 250 includes wireless terminal scrambling applicable segments' information 252 and information for segments not using scrambling 254. Wireless terminal scrambling applicable segments' information 252 includes a plurality of sets of channel segment type information (type 1 channel segment information 256, . . . , type N channel segment information 258). Type 1 channel segment information 256 includes a number of modulation symbols per segment 260 and corresponding bit identification information 262. Type N channel segment information 258 includes a number of modulation symbols per segment 264 and corresponding bit identification information 266.

Downlink timing/frequency structure information 244 includes, e.g., downlink channel segment information, OFDM symbol timing information, information pertaining to grouping of OFDM symbols, recurring channel segment/timing information, downlink tone block information, downlink carrier frequency information, and downlink tone hopping information. Uplink timing/frequency structure information 246 includes, e.g., uplink channel segment information, OFDM symbol timing information, information pertaining to groupings of OFDM symbols, recurring channel segment/timing information, uplink tone block information, uplink carrier frequency information, uplink tone hopping information, and dwell information.

Figure 5:
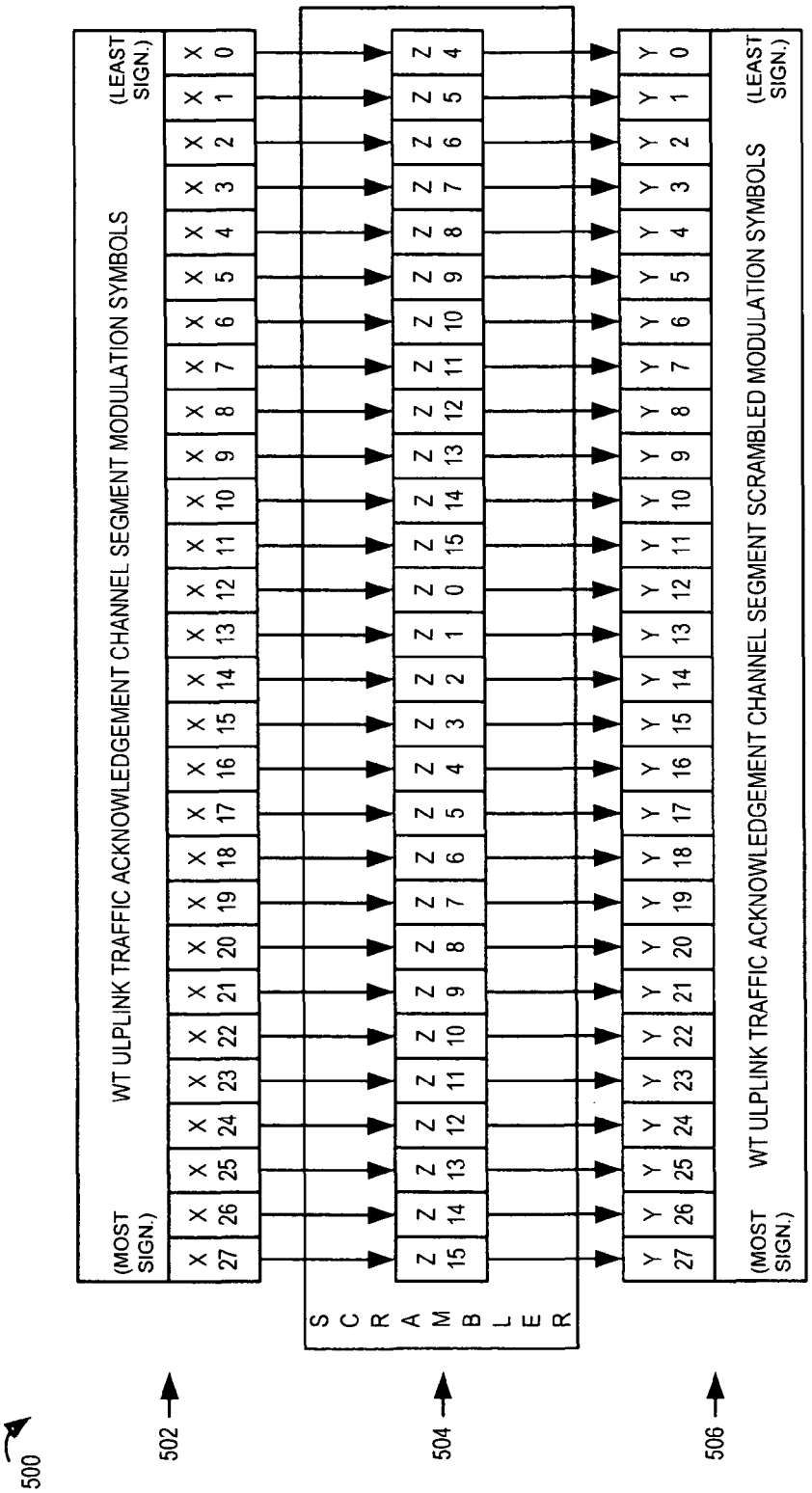
FIG. 5 is a drawing illustrating an exemplary mapping association between each of the ordered wireless terminal scrambling identification bits with each of the ordered uplink traffic acknowledgment channel modulation symbols for an exemplary embodiment.
Figure 9:
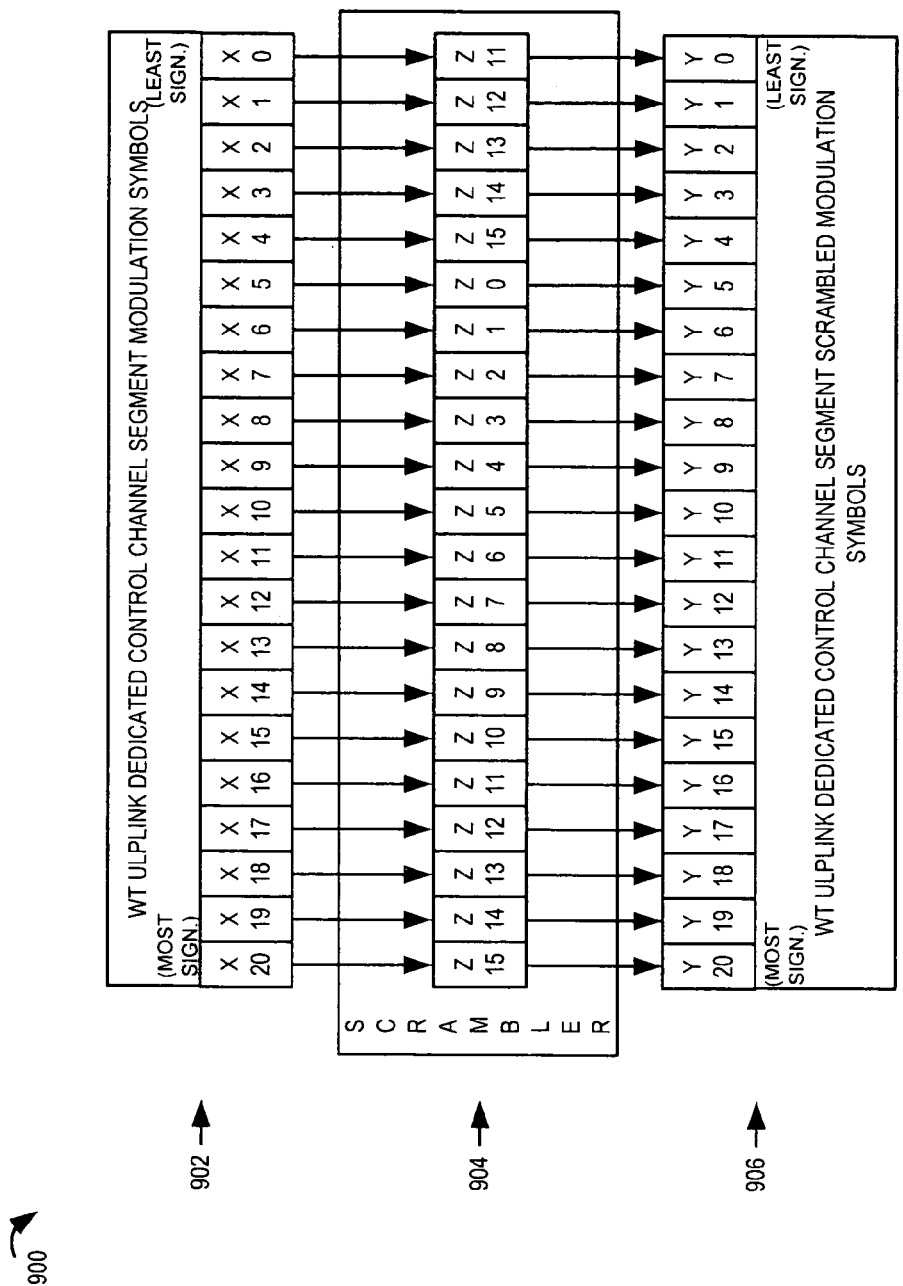
FIG. 9 is a drawing illustrating an exemplary mapping association between each of a subset of the set of ordered wireless terminal scrambling identification bits with each of the ordered wireless terminal uplink dedicated control channel modulation symbols for an exemplary segment in an exemplary embodiment.
Figure 11:
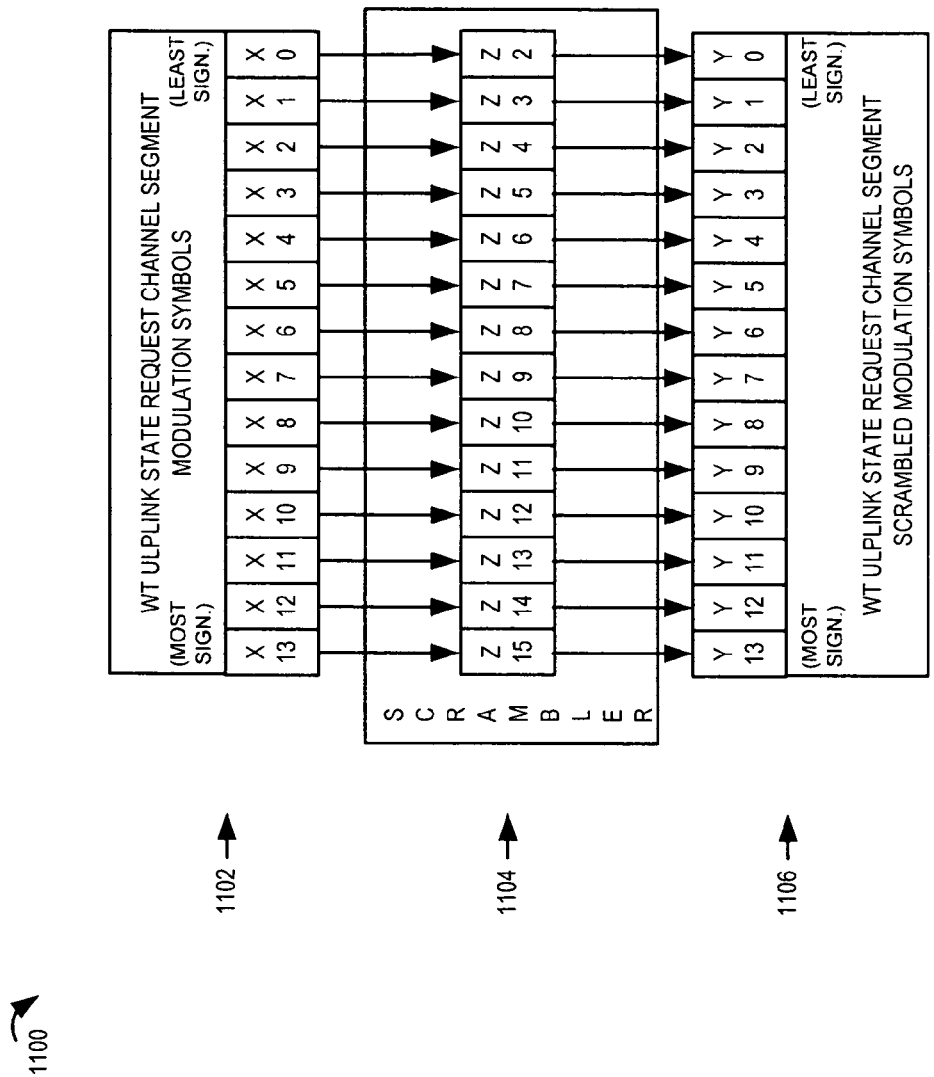
FIG. 11 is a drawing illustrating an exemplary mapping association between each of a subset of the set of ordered wireless terminal scrambling identification bits with each of the ordered wireless terminal state request channel modulation symbols for an exemplary segment in an exemplary embodiment.
Figure 13:
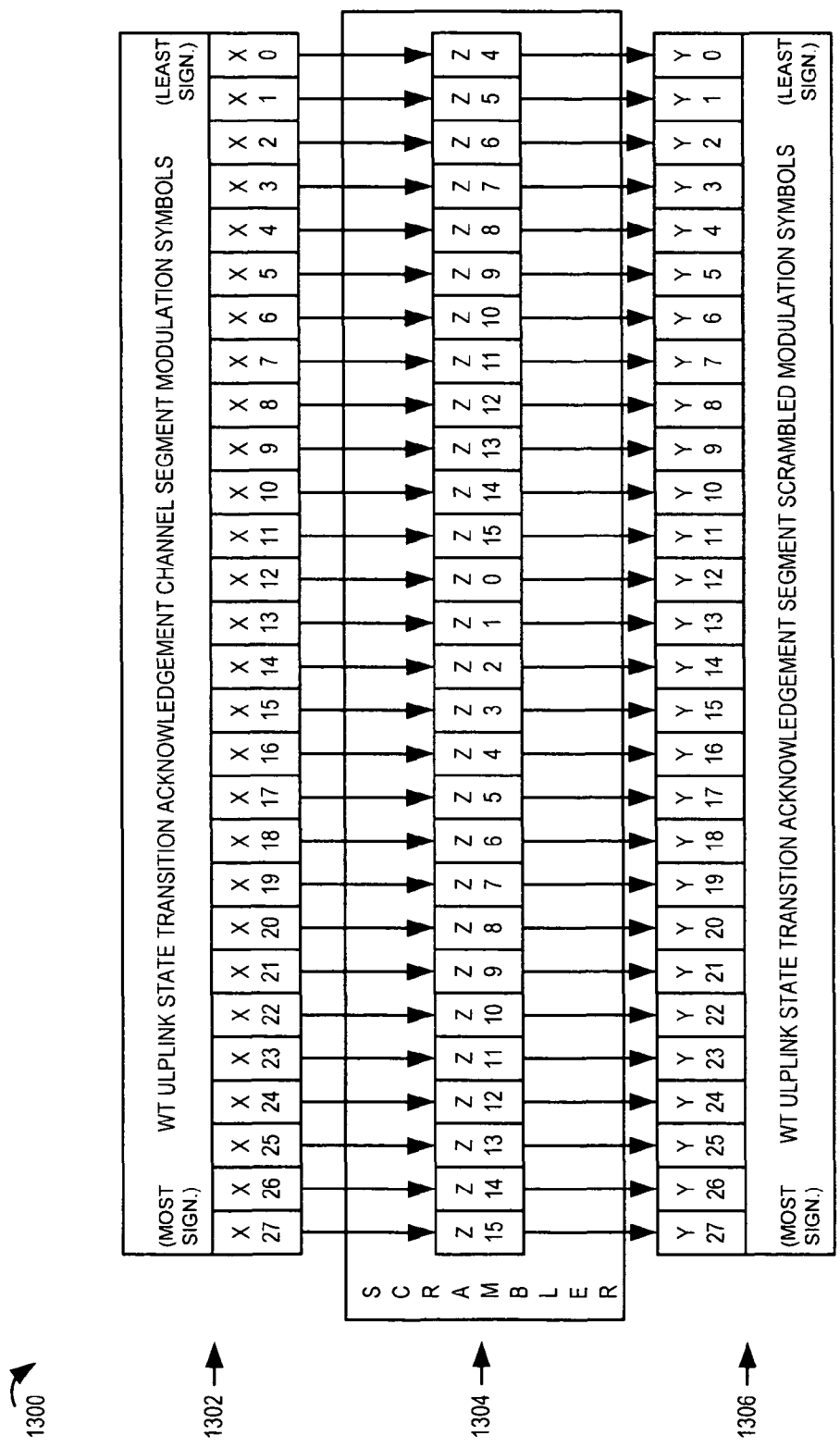
FIG. 13 is a drawing illustrating an exemplary mapping association between each of the ordered wireless terminal scrambling identification bits with each of the ordered uplink state transition acknowledgment segment modulation symbols for an exemplary embodiment.

WT scrambling applicable segments' information 252 includes information corresponding to different types of uplink segments to which a segment's modulation symbols are scrambled by a WT 300, e.g., using scrambling module 330 and using a WT scrambling identifier. The WT scrambling applicable segments' information 252 is used by the information recovery module 230. Some exemplary types of uplink channel segments which undergo WT scrambling will be described. For example, type 1 channel segment information 256, in some embodiments, corresponds to uplink traffic acknowledgement channel segment information, with the number of modulation symbols per segment 260 being 28 and the corresponding bit identification information 262 storing information matching indexed segment modulation symbols to indexed wireless terminal scrambling identifier bits as shown in the representation of FIG. 5. Continuing with the example, type N channel segment information 258, in some embodiments, corresponds to uplink dedicated control channel segment information, with the number of modulation symbols per segment 264 being 21 and the corresponding bit identification information 266 storing information matching indexed modulation symbols of the segment to indexed wireless terminal scrambling identifier bits as shown in the representation of FIG. 9. WT scrambling applicable segments' information 252 also includes sets of information corresponding to (i) a 14 modulation symbol uplink state request channel segment as shown in the representation of FIG. 11 and (ii) a 28 modulation symbol uplink state transition acknowledgment channel segment as shown in the representation of FIG. 13.

Information for segments not using scrambling 254 includes sets of information pertaining to uplink access exchange channel segments, uplink access signal timing control channel segments, and uplink access power control channel segments.

Phase rotation/scrambling identification bit mapping information 248 includes information identifying that if a wireless terminal scrambling identifier bit corresponding to a modulation symbol has a value of 0, the amount of phase rotation to be applied by unscrambling sub-module 232 is 0 degrees, while if the value of wireless terminal scrambling identifier bit corresponding to a modulation symbol is a value of 1, the amount of phase rotation to be applied by the un-scrambling sub-module 232 is 180 degrees. Other embodiments may use a different mapping.

In some embodiments a plurality of wireless terminal scrambling identifier bits are associated with a modulation symbol to be scrambled. For example, the pattern of two wireless terminal scrambling identifier bits may indicate an amount of rotation, e.g., 00=0 rotation, 01=270 degrees clockwise rotation, 10=180 degrees clockwise rotation, and 11=90 degrees clockwise rotation. In such an embodiment such mapping information is stored in information 236 to be used by the unscrambling sub-module 232.

In some embodiments, the number of wireless terminal scrambling identifier bits used to determine scrambling for a modulation symbol is a function of the type of modulation symbol constellation being used for the segment. For example, if a BPSK constellation is used for the segment one scrambling identifier bit is used, e.g., corresponding to rotation possibilities of 0 degrees and 180 degrees; if a QPSK constellation is used for the segment up to two scrambling identifier bits are used, e.g., two scrambling identifier bits corresponding to rotation possibilities of 0 degrees, 90 degrees, 180 degrees, and 270 degrees; if a QAM16 constellation is used for the segment up to 4 scrambling identifier bits are used, e.g., the 4 scrambling identifier bits corresponding to rotation possibilities of 0 degrees, 22.5 degrees, 45 degrees, 67.5 degrees, 90 degrees, 112.5 degrees, 135 degrees, 157.5 degrees, 180 degrees, 202.5 degrees, 225 degrees, 247.5 degrees, 270 degrees, 292.5 degrees, 315 degrees, 337.5 degrees.

Wireless terminal data/information 238 includes a plurality of sets of wireless terminal data/information (wireless terminal 1 data/information 268, . . . , wireless terminal N data/information 270). Wireless terminal 1 data/information 268 includes an active user identifier 272, a wireless terminal scrambling identifier 274, user device/session/resource information 276, a plurality of sets of received modulation symbols corresponding to uplink segments associated with WT1 (set 1 of received modulation symbols 278, . . . , set M of received modulation symbols 280), a plurality of sets of received information (recovered information bits 282, . . . , recovered information bits 284), and base station attachment point information 285.

Active user identifier 272 is a base station assigned user identifier, e.g., a seven bit wide identifier, corresponding to one of a plurality of active user identifier associated with a base station sector attachment point. Base station attachment point information 276 includes information associated with the base station sector attachment point which WT1 is currently using, e.g., a cell identifier value such as a slope value, a base station sector value, a base station sector type value, a tone block and/or carrier identifier value. In some embodiments base station 200 is a multi-sector base station, e.g., a three sector base station with three base station sectors. In some such embodiments each sector has a receiver module/transmitter module pair, e.g., with sectorized antennas being used. In some embodiments base station 200 supports multiple uplink/downlink tone block pairs in one or more of its sectors. Each combination of a base station sector and tone block pair for base station 200 corresponds to a different base station sector attachment point. WT scrambling identifier 274 is the wireless terminal scrambling identifier associated with active user identifier 272 and used by WT 1 for scrambling modulation symbols, on a modulation symbol by modulation symbol basis for segments identified by information 252. The WT scrambling identifier 274 is used by information recovery module 230, e.g. used in reversing scrambling operations performed by WT1 and rejecting interference from other wireless terminals erroneously transmitting in the segment but using a different wireless terminal scrambling identifier.

User/device/session/resource information 276 includes WT 1 user identification information, WT 1 device identification and control parameter information, WT 1 session identification information, WT 1 session state information, WT 1 peer node information, and WT1 resource information identifying resources allocated to WT1, e.g., base station assigned identifiers such as active user identifiers, On state identifier, and air link resources such as control and traffic channel segments allocated to the wireless terminal. Air link resources allocated to WT 1 includes segments allocated to WT 1 by segment allocation module 226.

Sets of received modulation symbols (278, 280) are outputs of the segment recovery module 228 and are inputs to the information recovery module 230. Set 1 of received modulation symbols 278 includes a set of modulation symbols corresponding to an uplink segment which has been allocated to WT1 for its non-contention based use to communicate uplink signals. A set of received modulation symbols, e.g., set 1 278, corresponds to received modulation symbols from one or more received OFDM symbols 240, . . . , 242). For example, consider that set 1 of received modulation symbols 278 corresponds to a dedicated control channel segment. In some such embodiments, the set 278 includes one modulation symbol from each of 21 received OFDM symbols. Set 1 of received modulation symbols 278 can include superposed signals from multiple wireless terminals, e.g., in the case where the wireless terminal to which the segment is dedicated is transmitting into the segment and another wireless terminal is erroneously transmitting into the segment. Recovered information bits 282 corresponds to set 1 of received modulation symbols 278 and represents an output from information recovery module 230.

Received OFDM symbol 1 information 240, . . . , received OFDM symbol N information 242 represents information corresponding to a plurality of wireless terminals transmitting uplink signals to a base station sector attachment point, e.g., as part of a multiple access OFDM wireless communications system. In some embodiments each OFDM symbol corresponds to a tone block of over 100 tones. For example, in one exemplary embodiment each OFDM symbol corresponds to 113 contiguous OFDM tones, individual tones being used to communicate individual modulation symbols, at least some of the modulation symbols having been scrambled by a wireless terminal with respect to the phase of the modulation symbol, said scrambling operation using a wireless terminal scrambling identifier associated with the wireless terminal, at least some different wireless terminals using different wireless terminal scrambling identifiers.

Figure 3:
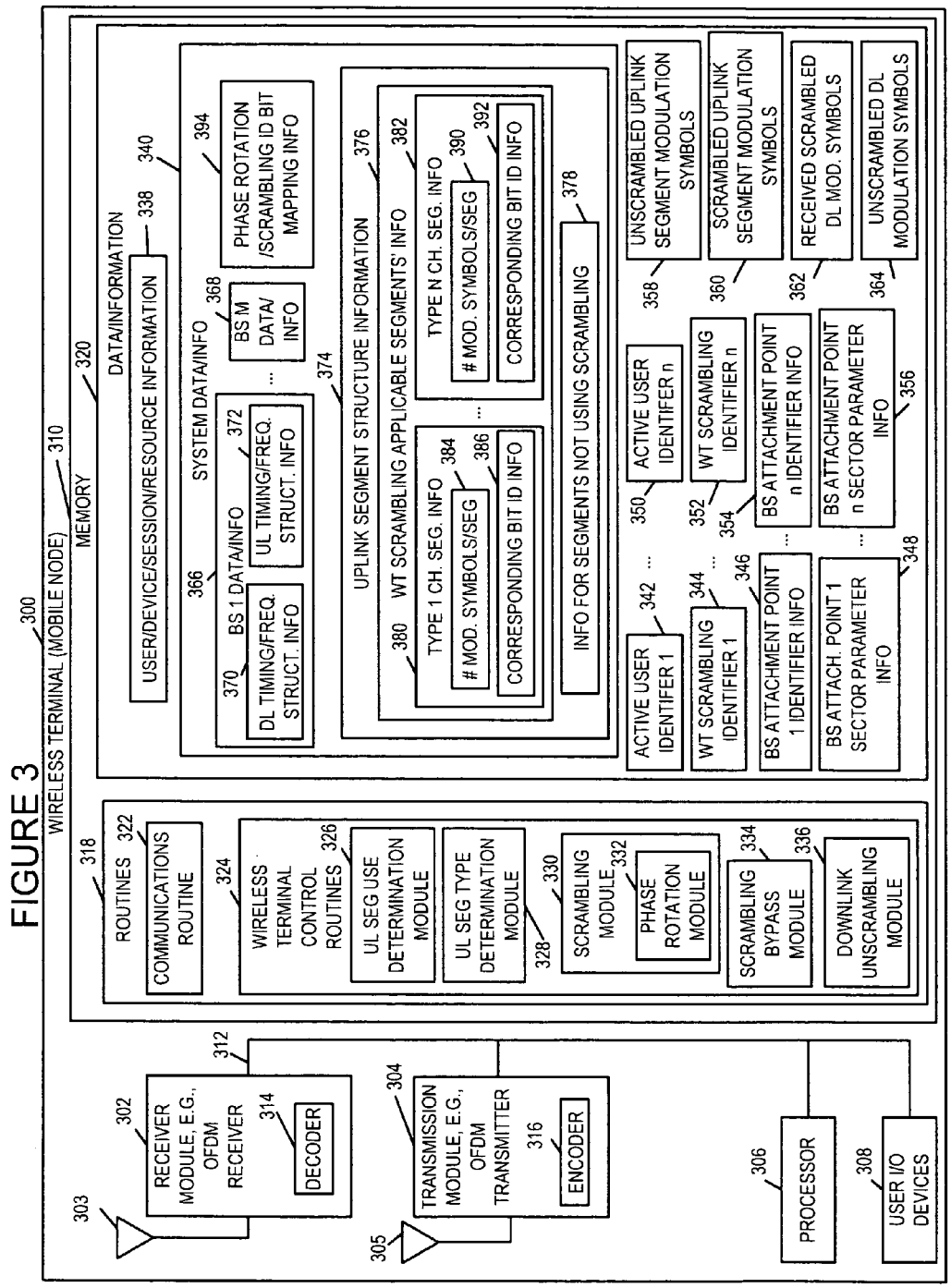
FIG. 3 is a drawing of an exemplary wireless terminal, e.g., mobile node, implemented in accordance with various embodiments.

FIG. 3 is a drawing of an exemplary wireless terminal (WT) 300, e.g., mobile node, implemented in accordance with various embodiments. Exemplary wireless terminal 300 may be any of the exemplary WTs of the system 100 of FIG. 1. Exemplary WT 300 includes a receiver module 302, a transmission module 304, a processor 306, user I/O devices 308, and memory 310 coupled together via a bus 312 over which the various elements may interchange data and information. Memory 310 includes routines 318 and data/information 320. The processor 306, e.g., a CPU, executes the routines 318 and uses the data/information 320 in memory 320 to control the operation of the wireless terminal 300 and implement methods.

Receiver module 302, e.g., an OFDM receiver, is coupled to receive antenna 303 via which the wireless terminal 300 receives downlink signals from base stations including broadcast signals and signals directed exclusively to WT 300. Receiver module 302 receives scrambled downlink modulation symbols directed exclusively to WT 300 which have been scrambled, by a base station, independent of the wireless terminal scrambling identifier. In some embodiments, the base station downlink scrambling is performed as part of OFDM symbol construction on an OFDM symbol basis. In one exemplary embodiment, an OFDM symbol uses a tone block of over 100 OFDM tones, e.g., 113 contiguous OFDM tones, for the duration of one symbol transmission time period. Individual modulation symbols are associated with different tones of the OFDM symbol. Receiver module 302 includes a decoder 314 used for decoding signals which were encoded by a base station prior to transmission.

Transmission module 304, e.g., an OFDM transmitter, is coupled to a transmit antenna 305 via which the wireless terminal 300 transmits uplink signals to base stations, at least some of the uplink signals include modulation symbols which have been scrambled with respect to phase as a function of a wireless terminal scrambling identifier. In some embodiments, additional scrambling is performed as part of OFDM symbol construction on an OFDM symbol basis as a function of base station sector information corresponding to a base station sector attachment point and/or position of a modulation symbol within an OFDM symbol. Transmission module 304 includes an encoder 316 for encoding information bits to be communicated into modulation symbols. Encoder module 316 uses different encoding schemes for at least some different types of segments. In various embodiments, the same antenna is used for both receiver module 302 and transmitter module 304, e.g., in conjunction with a duplex interface module included in the wireless terminal.

User I/O devices 308, e.g., microphone, keypad, keyboard, switches, camera, speaker, display, etc., allows a user of WT 300 to input user data, output user data, and control applications. In addition user I/O devices 308 allows the operator of WT 300 to control various functions of the WT 300, e.g., initiate a communications session.

Routines 318 include communications routine 322 and wireless terminal control routines 324. Communications routine 322 implements the various communications protocols used by the WT 300. Wireless terminal control routines 324 include an uplink segment use determination module 326, an uplink segment type determination module 328, a scrambling module 330, a scrambling bypass module 334, and a downlink unscrambling module 336.

Uplink segment use determination module 326 determines which uplink channel segments in a recurring uplink channel structure are to be used by the wireless terminal for transmitting uplink signals to a base station. Uplink segment use determination module 326 uses received resource assignment information and wireless terminal mode information in determining which of the uplink segments have been dedicated to the wireless terminal 300. At different times, different uplink segments are dedicated to WT 300 for its exclusive use. For example, when the wireless terminal 300 is in an ON state of operation in which the wireless terminal 300 may be allocated uplink traffic channel segments, the wireless terminal 300 receives a set of dedicated control channel (DCCH) segments, e.g., as a function of a base station assigned wireless terminal ON state identifier, for communicating uplink control channel reports; while at other times when WT 300 is in a sleep state the wireless terminal 300 does not receive such DCCH segments. As another example, whether or not the wireless terminal 300 uses a particular uplink traffic acknowledgment channel segment in a recurring structure depends upon whether or not the wireless terminal has been scheduled to receive a corresponding downlink traffic channel segment to which the acknowledgment is in response to. Uplink segment use determination module 326 also determines which contention based segments WT 300 should use, e.g., when sending access signals to request establishment of a connection with a base station sector attachment point.

Uplink segment type determination module 328 determines, for uplink segments that the wireless terminal 300 is determined to use, the type of segment in relation to whether or not user specific scrambling is to be used for the segment. Operation is directed to scrambling module 330 or scrambling bypass module 334, for at least some uplink segments, as a result of the determination. In addition, when a segment is determined to use user specific scrambling, module 328 fetches the relevant set of segment information from WT scrambling applicable segments' information 376 and forwards the information to scrambling module 330.

Scrambling module 330 scrambles a plurality of modulation symbols as a function of a wireless terminal scrambling identifier to produce scrambled modulation symbols. For example, scrambling module 330 uses as input unscrambled uplink segment modulation symbols 358 and produces as output scrambled uplink segment modulation symbols 360. Scrambling module 330 performs scrambling for different size uplink segments, e.g., a segment with 28 indexed modulation symbols, a segment with 21 indexed modulation symbols, or a segment with 14 indexed modulation symbols. A set of channel segment type information, e.g., information set 380 or information set 382 is used by scrambling module 330 in accordance with the determined type of segment.

Scrambling module 330 includes a phase rotation module 332. The phase rotation module 332 subjects a plurality of modulation symbols to be scrambled corresponding to a segment, on a symbol by symbol basis, to a phase rotation operation, wherein each phase rotation is by an amount which is one of a plurality of different amounts. The amount of the rotation being applied to a particular one of the modulation symbols is determined by a corresponding bit of a wireless terminal scrambling identifier. In this exemplary embodiment, the different amount of phase rotation are 0 degrees and 180 degrees, and phase rotation module applies 0 degrees of phase rotation to an input modulation symbol, if the corresponding bit of the wireless terminal identifier is 0 and applies 180 degrees of phase rotation to an input modulation symbol if the corresponding bit of the wireless terminal identifier is 1.

In various embodiments, the amount of rotation being applied to a particular one of the modulation symbols is determined by a corresponding L bits of the wireless terminal scrambling identifier where L is a positive number, e.g., a plurality of $2^L$ different amounts can be represented by the L bits. In this exemplary embodiment L=1, and 2 amounts 0 degrees and 180 degrees of phase shift can be indicated. In some other embodiments, L is a larger positive number, e.g., L=2 and 4 different amounts can be represented, e.g., phase shifts of 0 degrees, 90 degrees, 180 degrees, and 270 degrees in accordance with a predefined rotation direction.

The scrambling module 330 performing scrambling for different size segments, e.g., segments in which the number of modulation symbols exceeds the number of bits in a wireless terminal scrambling identifier, segments in which the number of modulation symbols matches the number of bits in a wireless terminal scrambling identifier, and segments in which the number of modulation symbols is less than the number of bits in a wireless terminal scrambling identifier.

As one example, consider that the wireless terminal scrambling identifier is a K bit identifier, that the segment to be scrambled has S modulation symbols, where K and S are positive integers, and S−K=X, where X is a non-negative integer. The modulation symbols of the segment are ordered, e.g., from most significant to least significant, and the bits of the K bit wireless terminal scrambling identifier are indexed. Phase rotation module 332 subjects the first K of the plurality of modulation symbols on a symbol by symbol basis to a phase rotation operation wherein the phase rotation is one of a first and second amount determined by a corresponding bit in the wireless terminal scrambling identifier, each bit of the wireless terminal scrambling identifier is used once when processing this first set of K modulation symbols. Continuing with the example, scrambling module 330 includes a control routine and/or circuitry for controlling that phase rotation operations are performed on the X additional modulation symbol of the segment. Phase rotation module 332 subjects the X additional modulation symbols of the segment, on a symbol by symbol basis, to a phase rotation operation wherein the phase rotation is one of the first and second amount determined by a corresponding bit in the wireless terminal identifier. In this example, each individual bit of the K-bit wireless terminal scrambling identifier corresponds to at most ceiling (S/K) different modulation symbols of the S modulation symbols of the segment.

As another example, consider that the wireless terminal scrambling identifier is a K bit identifier, that the segment to be scrambled has T symbols, K and T are positive integers and K is greater than T. The modulation symbols of the segment are ordered, e.g., from most significant to least significant, and the bits of the K bit wireless terminal scrambling identifier are indexed. Phase rotation module 332 subjects the T modulation symbols on a symbol by symbol basis to a phase rotation operation wherein the phase rotation is one of a first and second amount determined by a corresponding bit in the wireless terminal scrambling identifier, each bit of the wireless terminal scrambling identifier is used at most once when processing this set of T modulation symbols.

Scrambling bypass module 334 bypasses modulation symbol scrambling operations on modulation symbols corresponding to at least some uplink segments used by the wireless terminal 300, e.g., uplink access exchange channel segment, uplink access timing control channel segment, and uplink access signal power control channel segments.

Downlink unscrambling module 336 unscrambles received scrambled downlink modulation symbols 362 as a function of base station sector parameter information corresponding to a base station sector attachment point, e.g., a cell identifier such as base station sector slope value and a base station sector type identifier value. In this exemplary embodiment, downlink unscrambling module 336 also uses modulation symbol index within the OFDM symbol in performing modulation symbol unscrambling. The output of downlink unscrambling module 336 is unscrambled downlink modulation symbols 364.

In various embodiments, the wireless terminal also performs additional modulation symbol scrambling as part of OFDM symbol construction as a function of base station attachment point identifier information, e.g., a cell identifier, a sector identifier, a sector type identifier, a tone block identifier and/or a carrier identifier. In one such exemplary embodiment, some modulation symbols are subjected to both wireless terminal scrambling identifier modulation symbol scrambling and base station attachment point information based scrambling. For example an uplink dedicated control channel segment allocated to a wireless terminal may include 21 OFDM tone-symbols, one tone-symbol in each of 21 OFDM symbols, each of the 21 OFDM tone-symbols used to convey one modulation symbol of the dedicated control channel segment. The information bits to be conveyed by the dedicated control channel segment may be mapped to a set of 21 indexed modulation symbols. The indexed modulation symbols of the dedicated control channel segment are scrambled using the wireless terminal's scrambling identifier associated with the connection. In addition, as part of OFDM symbol construction the modulation symbols of an OFDM symbol are subjected to scrambling as a function of base station attachment point identifier information and modulation symbol position within the OFDM symbol. Thus in a given OFDM symbol being transmitted by the wireless terminal an individual modulation symbol may have been subjected to two levels of scrambling. In one such embodiment, some such individual modulation symbols subjected to the two types of scrambling include: wireless terminal uplink traffic acknowledgment channel segment modulation symbols, wireless terminal uplink dedicated control channel segment modulation symbols, wireless terminal uplink state request channel segment modulation symbols, and wireless terminal uplink state transition acknowledgment channel segment modulation symbols.

Data/information 320 includes user/device/session/resource information 338, system data/information 340, active user identifier 1 342, . . . , active user identifier n 350, wireless terminal scrambling identifier 1 344, . . . , wireless terminal scrambling identifier n 352, base station attachment point 1 identifier information 346, . . . , base station attachment point n identifier information 354, base station attachment point 1 sector parameter information 348, . . . , base station attachment point n sector parameter information 356, unscrambled uplink segment modulation symbols 358, scrambled uplink segment modulation symbols 360, received scrambled downlink modulation symbols 362, and unscrambled downlink modulation symbols 364.

User/device/session/resource information 338 includes user identification information, device identification and control parameter information, session identification information, session state information, peer node information, and resource information identifying resources allocated to the wireless terminal, e.g., base station assigned identifiers such as active user identifiers, On state identifiers, and air link resources such as control and traffic channel segments allocated to the wireless terminal 300.

A base station sector attachment point corresponds to a base station, a base station sector, and a downlink/uplink tone block pair being used by the base station sector. Each tone block pair is associated with at least one carrier frequency. For each base station sector attachment point for which wireless terminal 300 is an active user, the wireless terminal has a set of information. The set of information includes a base station assigned active user identifier, e.g., active user identifier 1 342, a wireless terminal scrambling identifier, e.g., WT scrambling identifier 1 344, base station attachment point identifier information, e.g., base station attachment point 1 identifier information 346, and base station attachment point sector parameter information, e.g., base station attachment point 1 sector parameter information 348. In various embodiments, the WT scrambling identifier includes more bits than the active user identifier to which it is associated. The active user identifier is in some embodiments a seven bit wide identifier. The WT scrambling identifier is, in some embodiments, a 16 bit wide identifier. BS attachment point identifier information includes, in some embodiments, a cell identifier, a sector identifier, a sector type identifier, and a tone block pair or carrier identifier. Base station attachment point sector parameter information, in some embodiments, includes a base station sector slope value and a base station sector type value associated with the base station attachment point.

In various embodiments, a WT scrambling identifier is a value communicated to the wireless terminal to be associated with a corresponding active user identifier with respect to the base station attachment point. In some embodiments, WT 300 can have multiple WT scrambling identifiers, e.g., (344, 352), which are different, each different one associated with a different base station sector attachment point. For example WT scrambling identifier 1 344 is used by WT 300 when performing scrambling operations corresponding to uplink segment signals which will be communicated via a first connection to base station sector attachment point 1, while WT scrambling identifier n 352 is used when performing scrambling operations corresponding to uplink segment signals which will be communicated via a second connection to base station attachment point n. In some embodiments, corresponding to WT 300 and a base station sector attachment point, its WT scrambling identifier may be different at different times.

In some embodiments, WT 300 uses the same wireless terminal scrambling identifier irrespective of the base station sector attachment point. For example, a single wireless terminal scrambling identifier may be loaded into WT 300 to be used by the WT 300 throughout the communications system.

System data/information 340 includes a plurality of sets of base station data/information (base station 1 data/information 366, . . . , base station M data/information 368), uplink segment structure information 374, and phase rotation/scrambling identifier bit mapping information 394. BS 1 data/information 366 includes downlink timing/frequency structure information 370 and uplink timing/frequency structure information 372. Uplink segment structure information 374 includes wireless terminal scrambling applicable segments' information 376 and information for segments not using scrambling 378. Wireless terminal scrambling applicable segments' information 376 includes a plurality of sets of information (type 1 channel segment information 380, . . . , type N channel segment information 382) corresponding to the different types of uplink segments which are to use modulation symbol scrambling based on a wireless terminal scrambling identifier. Type 1 channel segment information 380 includes a number of modulation symbols per segment 384 and corresponding bit identification information 386. Similarly, type N channel segment information 382 includes a number of modulation symbols per segment 390 and corresponding bit identification information 392.

Downlink timing/frequency structure information 370 includes, e.g., downlink channel segment information, OFDM symbol timing information, information pertaining to grouping of OFDM symbols, recurring channel segment/timing information, downlink tone block information, downlink carrier frequency information, and downlink tone hopping information. Uplink timing/frequency structure information 372 includes, e.g., uplink channel segment information, OFDM symbol timing information, information pertaining to grouping of OFDM symbols, recurring channel segment/timing information, uplink tone block information, uplink carrier frequency information, uplink tone hopping information, and dwell information.

WT scrambling applicable segments' information 376 includes information corresponding to different types of uplink segments to which a segment's modulation symbols are scrambled by scrambling module 330 using a WT scrambling identifier. For example, type 1 channel segment information 380, in some embodiments, corresponds to uplink traffic acknowledgement channel segment information, with the number of modulation symbols per segment 384 being 28 and the corresponding bit identification information 386 storing information matching indexed segment modulation symbols to indexed wireless terminal scrambling identifier bits as shown in the representation of FIG. 5. Continuing with the example, type N channel segment information 382, in some embodiments, corresponds to uplink dedicated control channel segment information, with the number of modulation symbols per segment 390 being 21 and the corresponding bit identification information 392 storing information matching indexed modulation symbols of the segment to indexed wireless terminal scrambling identifier bits as shown in the representation of FIG. 9. WT scrambling applicable segments' information 382 also includes sets of information corresponding to (i) a 14 modulation symbol uplink state request channel segment as shown in the representation of FIG. 11 and (ii) a 28 modulation symbol uplink state transition acknowledgment channel segment as shown in the representation of FIG. 13.

Information for segments not using scrambling 378 includes sets of information pertaining to uplink access exchange channel segments, uplink access signal timing control channel segments, and uplink access power control channel segments. Information included in information 378 is used by scrambling bypass module 334.

Phase rotation/scrambling identification bit mapping information 394 includes information identifying that if a wireless terminal scrambling identifier bit corresponding a modulation symbol has a value of 0, the amount of phase rotation to be applied by phase rotation module is 0 degrees, while if the value of wireless terminal scrambling identifier bit corresponding a modulation symbol is a value of 1, the amount of phase rotation to be applied by phase rotation module is 180 degrees. Other embodiments may use a different mapping.

In some embodiments a plurality of wireless terminal scrambling identifier bits are associated with a modulation symbol to be scrambled. For example, the pattern of two wireless terminals scrambling identifier bits may indicate an amount of rotation, e.g., 00=0 rotation, 01=90 degrees clockwise rotation, 10=180 degrees clockwise rotation, and 11=270 degrees clockwise rotation. In such an embodiment such mapping information is stored in information 394 to be used by phase rotation module 332.

In some embodiments, the number of wireless terminal scrambling identifier bits used to determine scrambling for a modulation symbol is a function of the type of modulation symbol constellation being used for the segment. For example, if a BPSK constellation is used for the segment one scrambling identifier bit is used, e.g., corresponding to rotation possibilities of 0 degrees and 180 degrees; if a QPSK constellation is used for the segment up to two scrambling identifier bits are used, e.g., two scrambling identifier bits corresponding to rotation possibilities of 0 degrees, 90 degrees, 180 degrees, and 270 degrees; if a QAM16 constellation is used for the segment up to 4 scrambling identifier bits are used, e.g., four scrambling identifier bits corresponding to rotation possibilities of 0 degrees, 22.5 degrees, 45 degrees, 67.5 degrees, 90 degrees, 112.5 degrees, 135 degrees, 157.5 degrees, 180 degrees, 202.5 degrees, 225 degrees, 247.5 degrees, 270 degrees, 292.5 degrees, 315 degrees, 337.5 degrees.

FIG. 4 describes exemplary wireless terminal scrambling identifiers in accordance with various embodiments. Drawing 400 illustrates the format for an exemplary 16-bit wireless terminal scrambling identifier (wtScramblingID). The 16 bits are ordered from most significant bit to least significant bit ($Z_{15}, Z_{14}, Z_{13}, Z_{12}, Z_{11}, Z_{10}, Z_9, Z_8, Z_7, Z_6, Z_5, Z_4, Z_3, Z_2, Z_1, Z_0$). In other embodiments, the length of the wireless terminal scrambling identifier may be different. Sometimes, the wireless terminal scrambling identifier is also referred to as a wireless terminal scrambling mask (wtScramblingMask). The wireless terminal scrambling identifier is a number given to the wireless terminal when the wireless terminal is connected to a base station sector attachment point, e.g., as part of a registration process or handoff process. The wireless terminal scrambling identifier is used in scrambling the modulation symbols of predetermined types of channel segments using the connection, e.g., when in an active state of operation such as an active Hold state or an active On state. In some embodiments, the predetermined types of channel segments include at least one of: a wireless terminal uplink traffic acknowledgement channel segment, a wireless terminal uplink dedicated control channel segment, a wireless terminal uplink state request channel segment, and a wireless terminal state transition acknowledgement channel segment. In some embodiments, if a wireless terminal has multiple concurrent connections, the wireless terminal has a wireless terminal scrambling identifier associated with each connection, and the value of the scrambling identifiers corresponding to different connections may be the same or different. In addition, in some embodiments, for a given base station sector connection corresponding to a specific base station sector and tone block, the wireless terminal scrambling identifier assigned to a wireless terminal at one time may be the same or different than the wireless terminal scrambling identifier assigned to the same wireless terminal at another time.

Drawing 402 is an illustration of an exemplary 16 bit wireless terminal scrambling identifier currently assigned to exemplary wireless terminal A corresponding to a first base station sector connection, which has the bit pattern (0101010101010101) from most significant bit to least significant bit. Drawing 404 is an illustration of an exemplary 16 bit wireless terminal scrambling identifier currently assigned to exemplary wireless terminal A corresponding to a second base station sector connection, which has the bit pattern (0000011100000001) from most significant bit to least significant bit. Drawing 406 is an illustration of an exemplary 16 bit wireless terminal scrambling identifier currently assigned to exemplary wireless terminal B corresponding to another base station sector connection, which has the bit pattern (1011001000100111) from most significant bit to least significant bit. WT A and WT B may be implemented in accordance with exemplary wireless terminal 300.

FIG. 5 is a drawing 500 illustrating an exemplary mapping association between each of the ordered wireless terminal scrambling identification bits with each of the ordered uplink traffic acknowledgment channel segment modulation symbols for an exemplary embodiment. Block 502 shows 28 ordered modulation symbols from most significant modulation symbol to least significant modulation symbol (X27, X26, X25, X24, X23, X22, X21, X20, X19, X18, X17, X16, X15, X14, X13, X12, X11, X10, X9, X8, X7, X6, X5, X4, X3, X2, X1, X0), which are input to scrambler 504. Scrambler 504 associates the most significant wireless terminal scrambling ID bit Z15 with the most significant input modulation symbol X27 and scrambles, e.g., phase rotates, modulation symbol X27, as a function of the value of Z15 to generate output most significant modulation symbol Y27. This process is repeated for each of the successive lower significant modulation symbol/wireless terminal scrambling ID bit pairs until each the wireless scrambling identifier bits are used. Thus input modulation symbol values (X27, X26, X25, X24, X23, X22, X21, X20, X19, X18, X17, X16, X15, X14, X13, X12) are associated with scrambling ID bits (Z15, Z14, Z13, Z12, Z11, Z10, Z9, Z8, Z7, Z6, Z5, Z4, Z3, Z2, Z1, Z0), and a scrambling operation is performed by scrambler 504 to produce output scrambled modulation symbols (Y27, Y26, Y25, Y24, Y23, Y22, Y21, Y20, Y19, Y18, Y17, Y16, Y15, Y14, Y13, Y12), respectively. The remaining input modulation symbol values (X1, X10, X9, X8, X7, X6, X5, X4, X3, X2, X1, X0) are associated with scrambling ID bits (Z15, Z14, Z13, Z12, Z11, Z10, Z9, Z8, Z7, Z6, Z5, Z4), and a scrambling operation is performed by scrambler 504 to produce output scrambled modulation symbols (Y11, Y10, Y9, Y8, Y7, Y6, Y5, Y4, Y3, Y2, Y1, Y0), respectively. As shown, when processing the ordered input modulation symbols of the segment from most significant to least significant the wireless terminal scrambling ID bits are used, one at a time, from most significant to least significant until each of the ordered scrambling ID bits has been used. Then, the wireless terminal starts reusing the scrambling ID bits from most significant to least significant, one at a time, until the remaining input modulation symbols of the set of ordered input modulation symbols corresponding to the segment has been processed. The scrambling operation produces 28 ordered scrambled modulation symbols from most significant modulation symbol to least significant modulation symbol (Y27, Y26, Y25, Y24, Y23, Y22, Y21, Y20, Y19, Y18, Y17, Y16, Y15, Y14, Y13, Y12, Y11, Y0, Y9, Y8, Y7, Y6, Y5, Y4, Y3, Y2, Y1, Y0) illustrated by block 506, which are communicated over the wireless terminal traffic acknowledgment channel segment.

Figure 6:
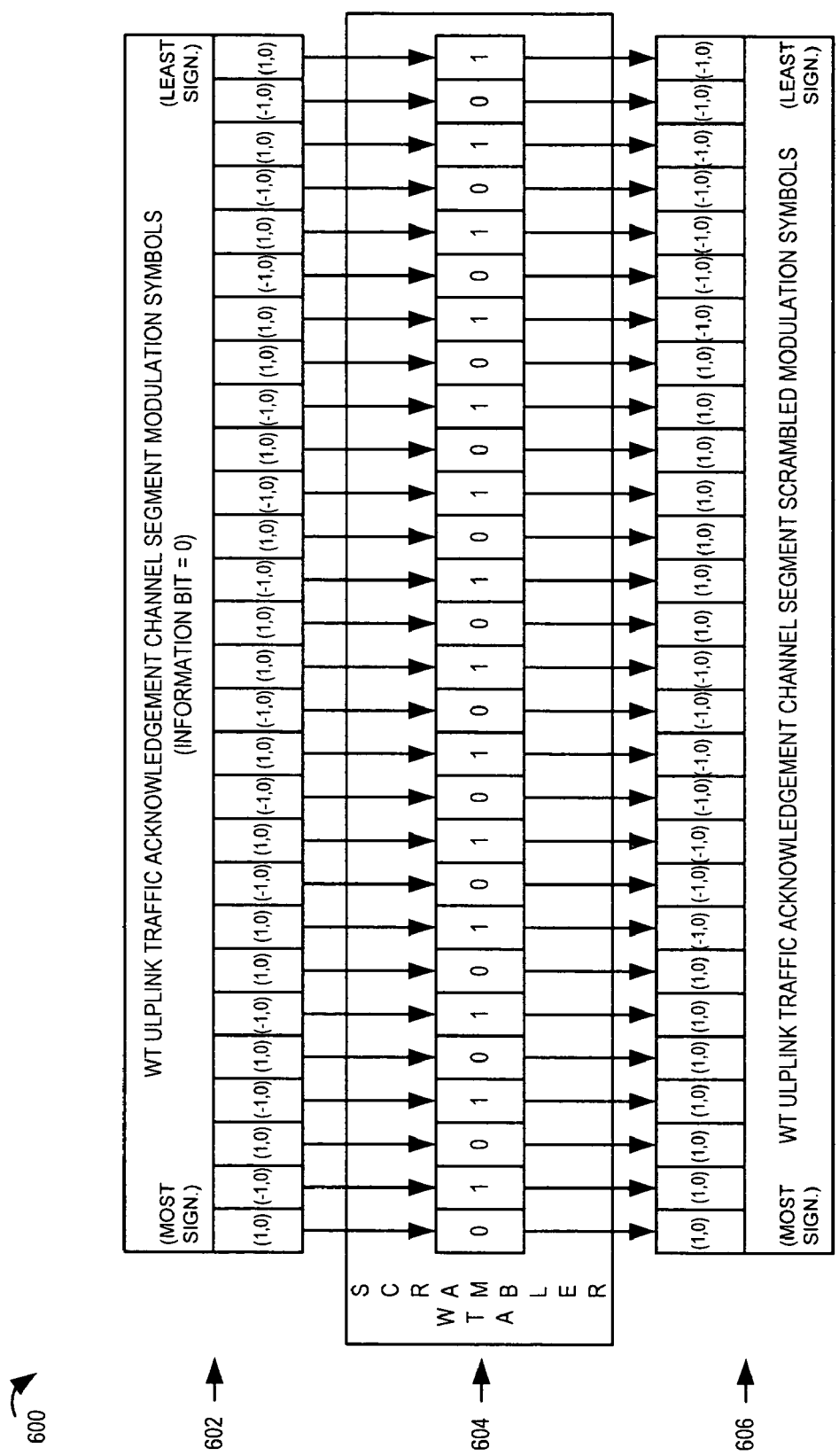
FIG. 6 is a drawing illustrating exemplary modulation symbol scrambling in accordance with various embodiments.

FIG. 6 is a drawing 600 illustrating exemplary modulation symbol scrambling in accordance with various embodiments. Block 602 illustrates an exemplary WT uplink traffic channel acknowledgment channel segment set of 28 ordered modulation symbols, from most to least significant modulation symbol ((1,0), (−1,0), (1,0), (−1,0), (1,0), (−1,0), (1,0), (1,0), (−1,0), (1,0), (−1,0), (1,0), (−1,0), (1,0), (1,0), (−1,0), (1,0), (−1,0), (1,0), (−1,0), (1,0), (1,0), (−1,0), (1,0), (−1,0), (1,0), (−1,0), (1,0), (−1,0), (1,0), (1,0)) corresponding to a single information bit=0. Block 602 of FIG. 6 may correspond to block 502 of FIG. 5. WTA scrambler 604 uses WT scrambling ID=0101010101010101 to scramble the modulation input modulation symbols of block 602 and generate an ordered set of scrambled modulation symbols from most significant to least significant ((1,0), (1,0), (1,0), (1,0), (1,0), (1,0), (1,0), (−1,0), (−1,0), (−1,0), (−1,0), (−1,0), (−1,0), (1,0), (1,0), (1,0), (1,0), (1,0), (1,0), (−1,0), (−1,0), (−1,0), (−1,0), (−1,0), (−1,0), (−1,0)). Block 604 of FIG. 6 may correspond to block 504 of FIG. 5 using wtScrambling ID of drawing 402 of FIG. 4, while block 606 of FIG. 6 may correspond to block 506 of FIG. 5.

Figure 7:
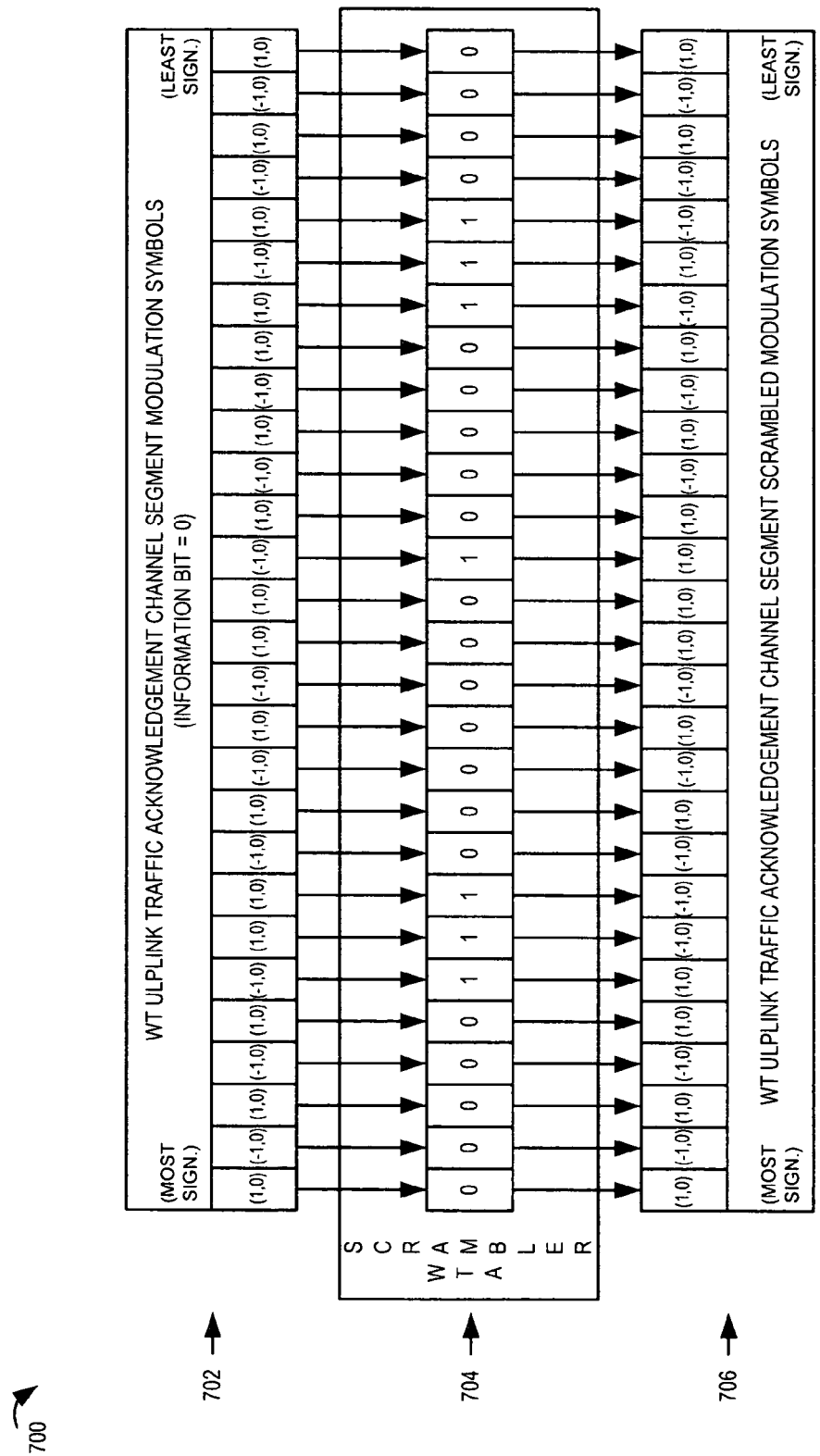
FIG. 7 is a drawing illustrating exemplary modulation symbol scrambling in accordance with various embodiments.

FIG. 7 is a drawing 700 illustrating exemplary modulation symbol scrambling in accordance with various embodiments. Block 702 illustrates an exemplary WT uplink traffic channel acknowledgment channel segment set of 28 ordered modulation symbols, from most to least significant modulation symbol ((1,0), (−1,0), (1,0), (−1,0), (1,0), (−1,0), (1,0), (1,0), (−1,0), (1,0), (−1,0), (1,0), (−1,0), (1,0), (1,0), (−1,0), (1,0), (−1,0), (1,0), (1,0), (−1,0), (1,0), (−1,0), (1,0), (−1,0), (1,0), (1,0)) corresponding to a single information bit=0. Block 702 of FIG. 7 may correspond to block 502 of FIG. 5. WTA scrambler 704 uses WT scrambling ID=0000011100000001 to scramble the modulation input modulation symbols of block 702 and generate an ordered set of scrambled modulation symbols from most significant to least significant ((1,0), (−1,0), (1,0), (−1,0), (1,0), (1,0), (−1,0), (−1,0), (1,0), (−1,0), (1,0), (−1,0), (1,0), (1,0), (1,0), (1,0), (−1,0), (1,0), (−1,0), (1,0), (−1,0), (1,0), (−1,0), (−1,0), (1,0), (−1,0), (1,0)). Block 704 of FIG. 7 may correspond to block 504 of FIG. 5 using wtScrambling ID of drawing 404 of FIG. 4, while block 706 of FIG. 7 may correspond to block 506 of FIG. 5.

Figure 8:
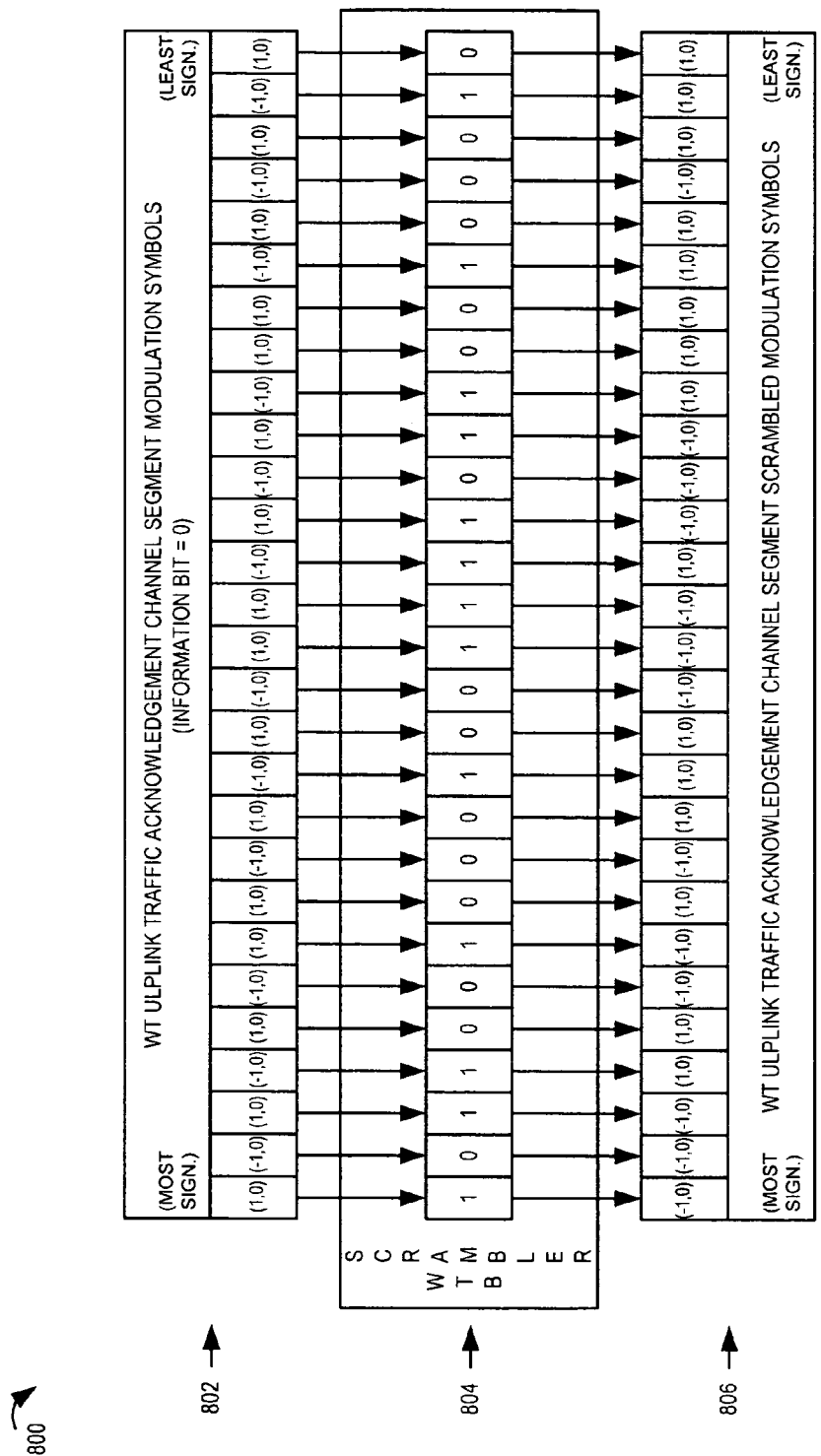
FIG. 8 is a drawing illustrating another exemplary modulation symbol scrambling in accordance with various embodiments.

FIG. 8 is a drawing 800 illustrating another exemplary modulation symbol scrambling in accordance with various embodiments. Block 802 illustrates an exemplary WT uplink traffic acknowledgment channel segment set of 28 ordered modulation symbols, from most to least significant modulation symbol ((1,0), (−1,0), (1,0), (−1,0), (1,0), (−1,0), (1,0), (1,0), (−1,0), (1,0), (−1,0), (1,0), (−1,0), (1,0), (1,0), (−1,0), (1,0), (−1,0), (1,0), (1,0), (−1,0), (1,0), (−1,0), (1,0), (−1,0), (1,0), (1,0)) corresponding to a single information bit=0. Block 802 of FIG. 8 may correspond to block 502 of FIG. 5. WTB scrambler 804 uses WT scrambling ID=1011001000100111 to scramble the modulation input modulation symbols of block 802 and generate an ordered set of scrambled modulation symbols from most significant to least significant ((−1,0), (−1,0), (−1,0), (1,0), (1,0), (−1,0), (−1,0), (1,0), (−1,0), (1,0), (1,0), (1,0), (−1,0), (−1,0), (−1,0), (1,0), (−1,0), (−1,0), (−1,0), (1,0), (1,0), (1,0), (1,0), (1,0), (−1,0), (1,0), (1,0), (1,0)). Block 804 of FIG. 8 may correspond to block 504 of FIG. 5 using wtScrambling ID of drawing 406 of FIG. 4, while block 806 of FIG. 6 may correspond to block 506 of FIG. 5.

FIG. 9 is a drawing 900 illustrating an exemplary mapping association between each of a subset of the set of ordered wireless terminal scrambling identification bits with each of the ordered wireless terminal uplink dedicated control channel modulation symbols for an exemplary segment in an exemplary embodiment. Block 902 shows 21 ordered modulation symbols from most significant modulation symbol to least significant modulation symbol (X20, X19, X18, X17, X16, X15, X14, X13, X12, X11, X10, X9, X8, X7, X6, X5, X4, X3, X2, X1, X0), which are input to scrambler 904. Scrambler 904 associates the most significant wireless terminal scrambling ID bit Z15 with the most significant input modulation symbol X20 and scrambles, e.g., phase rotates, modulation symbol X20, as a function of the value of Z15 to generate output most significant modulation symbol Y20. This process is repeated for each of the successive lower significant modulation symbol/wireless terminal scrambling ID bit pairs until each the wireless scrambling identifier bits are used. Thus input modulation symbol values (X20, X19, X18, X17, X16, X15, X14, X13, X12, X11, X10, X9, X7, X6, X5) are associated with scrambling ID bits (Z15, Z14, Z13, Z12, Z11, Z10, Z9, Z8, Z7, Z6, Z5, Z4, Z3, Z2, Z1, Z0), and a scrambling operation is performed by scrambler 904 to produce output scrambled modulation symbols (Y20, Y19, Y18, Y17, Y16, Y15, Y14, Y13, Y2, Y11, Y10, Y9, Y8, Y7, Y6, Y5), respectively. The remaining input modulation symbol values (X4, X3, X2, X1, X0) are associated with scrambling ID bits (Z15, Z14, Z13, Z12, Z11), and a scrambling operation is performed by scrambler 904 to produce output scrambled modulation symbols (Y4, Y3, Y2, Y1, Y0), respectively. As shown, when processing the ordered input modulation symbols of the segment from most significant to least significant the wireless terminal scrambling ID bits are used, one at a time, from most significant to least significant until each of the ordered scrambling ID bits has been used. Then, the wireless terminal starts reusing the scrambling ID bits from most significant to least significant, one at a time, until the remaining input modulation symbols of the set of ordered input modulation symbols corresponding to the segment has been processed. The scrambling operation produces 21 ordered scrambled modulation symbols from most significant modulation symbol to least significant modulation symbol (Y20, Y19, Y18, Y17, Y16, Y15, Y14, Y13, Y12, Y11, Y10, Y9, Y8, Y7, Y6, Y5, Y4, Y3, Y2, Y1, Y0) illustrated by block 906, which are communicated over the wireless terminal uplink dedicated control channel segment.

Figure 10:
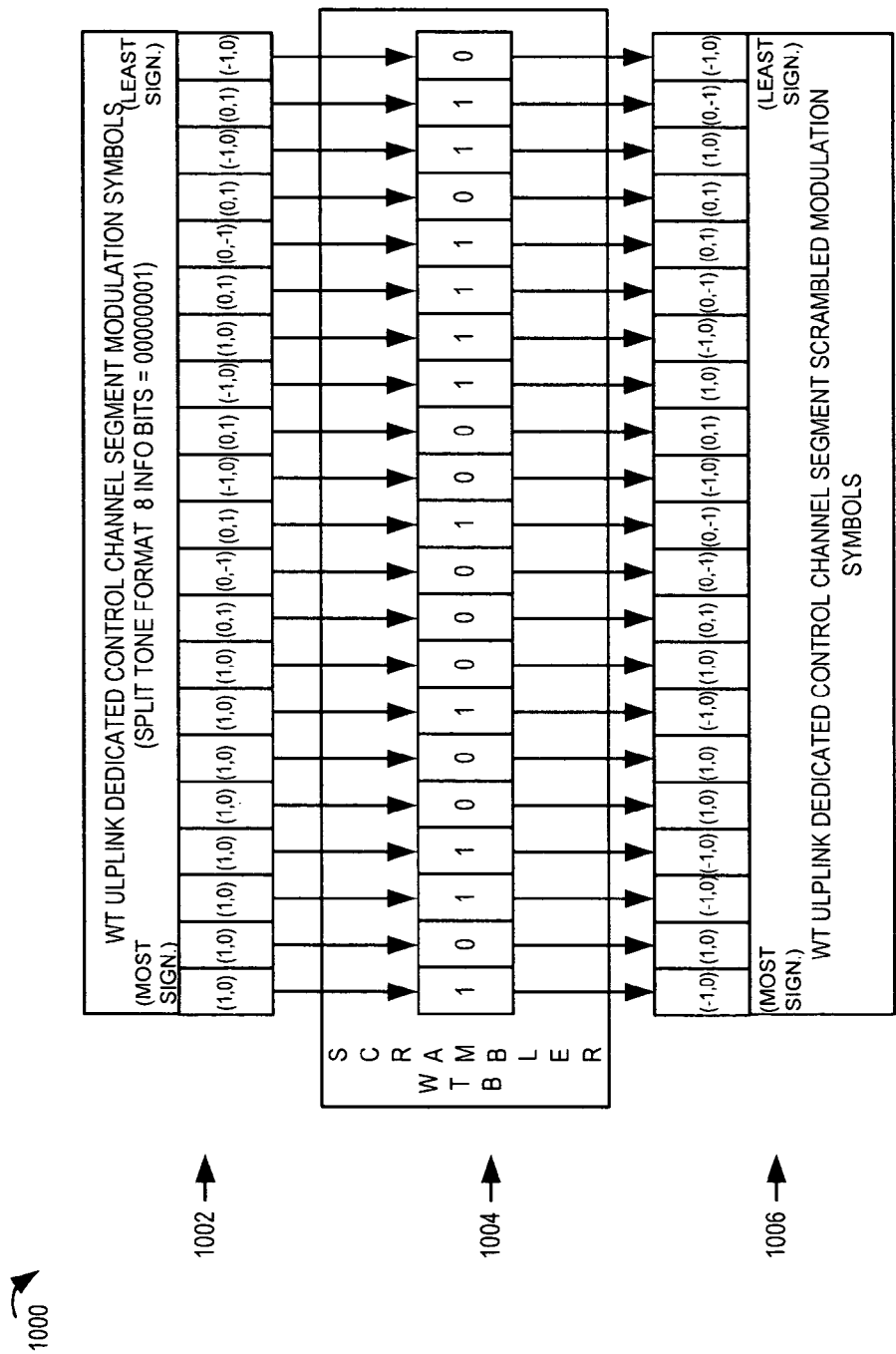
FIG. 10 is a drawing illustrating exemplary modulation symbol scrambling in accordance with various embodiments.

FIG. 10 is a drawing 1000 illustrating exemplary modulation symbol scrambling in accordance with various embodiments. Block 1102 illustrates an exemplary WT uplink dedicated control channel segment set of 21 ordered modulation symbols, from most to least significant modulation symbol ((1,0), (1,0), (1,0), (1,0), (1,0), (1,0), (1,0), (1,0), (0,1), (0,−1), (0,1), (−1,0), (0,1), (−1,0), (1,0), (0,1), (0,−1), (0,1), (−1,0), (0,1), (−1,0)) corresponding to eight ordered information bit=00000001 in split-tone format. Block 1002 of FIG. 10 may correspond to block 902 of FIG. 9. WTB scrambler 1004 uses WT scrambling ID=1011001000100111 to scramble the modulation input modulation symbols of block 1002 and generate an ordered set of scrambled modulation symbols from most significant to least significant ((−1,0), (1,0), (−1,0), (−1,0), (1,0), (1,0), (−1,0), (1,0), (0,1), (0,−1), (0,−1), (−1,0), (0,1), (1,0), (−1,0), (0,−1), (0,1), (0,1), (1,0), (0,−1), (−1,0)). Block 1004 of FIG. 10 may correspond to block 904 of FIG. 9 using wtScrambling ID of drawing 406 of FIG. 4, while block 1006 of FIG. 10 may correspond to block 906 of FIG. 9.

FIG. 11 is a drawing 1100 illustrating an exemplary mapping association between each of a subset of the set of ordered wireless terminal scrambling identification bits with each of the ordered wireless terminal state request channel modulation symbols for an exemplary segment in an exemplary embodiment. Block 1102 shows 14 ordered modulation symbols from most significant modulation symbol to least significant modulation symbol (X13, X12, X11, X10, X9, X8, X7, X6, X5, X4, X3, X2, X1, X0), which are input to scrambler 1104. Scrambler 1104 associates the most significant wireless terminal scrambling ID bit Z15 with the most significant input modulation symbol X13 and scrambles, e.g., phase rotates, modulation symbol X13, as a function of the value of Z15 to generate output most significant modulation symbol Y13. This process is repeated for each of the successive lower significant modulation symbol/wireless terminal scrambling ID bit pairs until there are no more input modulation symbols of the segment. Thus input modulation symbol values (X13, X12, X11, X10, X9, X7, X6, X5, X4, X3, X2, X1, X0) are associated with scrambling ID bits (Z15, Z14, Z13, Z12, Z11, Z10, Z9, Z8, Z7, Z6, Z5, Z4, Z3, Z2), and a scrambling operation is performed by scrambler 1104 to produce output scrambled modulation symbols (Y13, Y12, Y11, Y10, Y9, Y8, Y7, Y6, Y5, Y4, Y3, Y2, Y1, Y0), respectively. The scrambling operation produces 14 ordered scrambled modulation symbols from most significant modulation symbol to least significant modulation symbol (Y13, Y12, Y11, Y10, Y9, Y8, Y7, Y6, Y5, Y4, Y3, Y2, Y1, Y0) illustrated by block 1106, which are communicated over the wireless terminal uplink state request channel segment.

Figure 12:
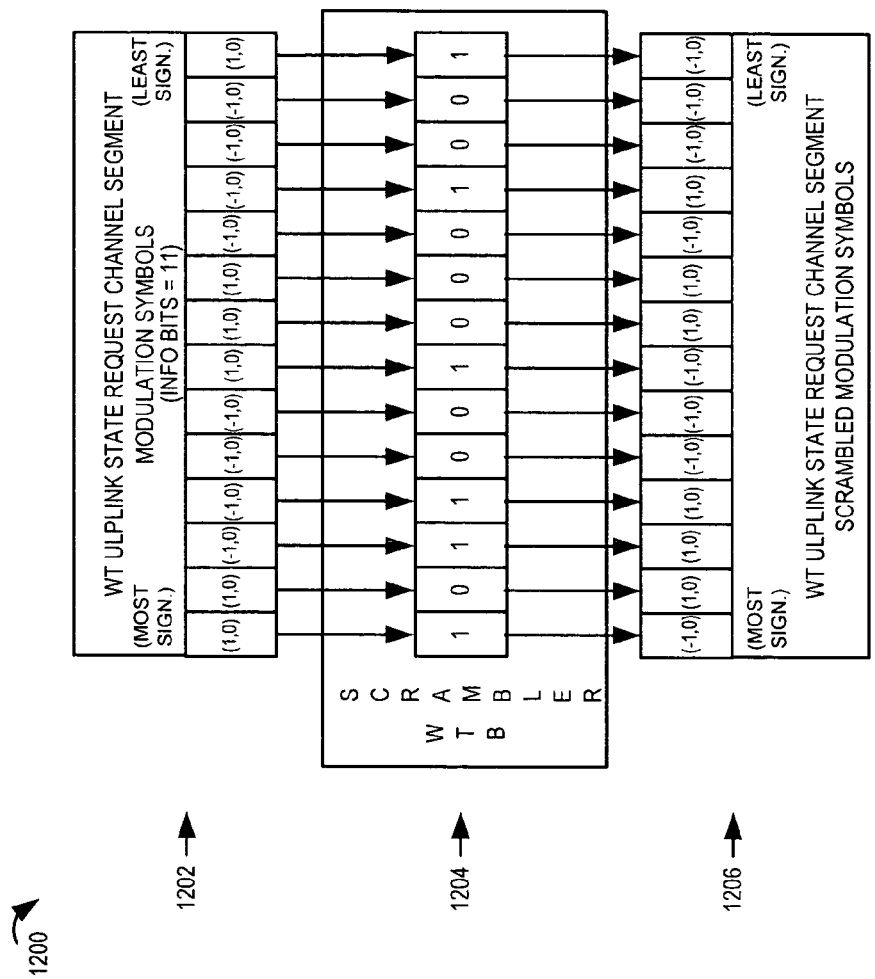
FIG. 12 is a drawing illustrating exemplary modulation symbol scrambling in accordance with various embodiments.

FIG. 12 is a drawing 1200 illustrating exemplary modulation symbol scrambling in accordance with various embodiments. Block 1202 illustrates an exemplary WT uplink state request channel segment set of 14 ordered modulation symbols, from most to least significant modulation symbol ((1,0), (1,0), (−1,0), (−1,0), (−1,0), (−1,0), (1,0), (1,0), (1,0), (−1,0), (−1,0), (−1,0), (−1,0), (1,0)) corresponding to two ordered information bits=11. Block 1202 of FIG. 12 may correspond to block 1102 of FIG. 11. WTB scrambler 1204 uses a first portion (10110010001001) of WT scrambling ID=1011001000100111 to scramble the modulation input modulation symbols of block 1202 and generate an ordered set of scrambled modulation symbols from most significant to least significant ((−1,0), (1,0), (1,0), (1,0), (−1,0), (−1,0), (−1,0), (1,0), (1,0), (−1,0), (1,0), (−1,0), (−1,0), (−1,0)). Block 1204 of FIG. 12 may correspond to block 1104 of FIG. 11 using wtScrambling ID of drawing 406 of FIG. 4, while block 1206 of FIG. 12 may correspond to block 1106 of FIG. 11.

FIG. 13 is a drawing 1300 illustrating an exemplary mapping association between each of the ordered wireless terminal scrambling identification bits with each of the ordered uplink state transition acknowledgment channel segment modulation symbols for an exemplary embodiment. Block 1302 shows 28 ordered modulation symbols from most significant modulation symbol to least significant modulation symbol (X27, X26, X25, X24, X23, X22, X21, X20, X19, X18, X17, X16, X15, X14, X13, X12, X11, X10, X9, X8, X7, X6, X5, X4, X3, X2, X1, X0), which are input to scrambler 1304. Scrambler 1304 associates the most significant wireless terminal scrambling ID bit Z15 with the most significant input modulation symbol X27 and scrambles, e.g., phase rotates, modulation symbol X27, as a function of the value of Z15 to generate output most significant modulation symbol Y27. This process is repeated for each of the successive lower significant modulation symbol/wireless terminal scrambling ID bit pairs until each the wireless scrambling identifier bits are used. Thus input modulation symbol values (X27, X26, X25, X24, X23, X22, X21, X20, X19, X18, X17, X16, X15, X14, X13, X12) are associated with scrambling ID bits (Z15, Z14, Z13, Z12, Z11, Z10, Z9, Z8, Z7, Z6, Z5, Z4, Z3, Z2, Z1, Z0), and a scrambling operation is performed by scrambler 1304 to produce output scrambled modulation symbols (Y27, Y26, Y25, Y24, Y23, Y22, Y21, Y20, Y19, Y18, Y17, Y16, Y15, Y14, Y13, Y12), respectively. The remaining input modulation symbol values (X11, X10, X9, X8, X7, X6, X5, X4, X3, X2, X1, X0) are associated with scrambling ID bits (Z15, Z14, Z13, Z12, Z11, Z10, Z9, Z8, Z7, Z6, Z5, Z4), and a scrambling operation is performed by scrambler 1304 to produce output scrambled modulation symbols (Y11, Y0, Y9, Y8, Y7, Y6, Y5, Y4, Y3, Y2, Y1, Y0), respectively. As shown, when processing the ordered input modulation symbols of the segment from most significant to least significant the wireless terminal scrambling ID bits are used, one at a time, from most significant to least significant until each of the ordered scrambling ID bits has been used. Then, the wireless terminal starts reusing the scrambling ID bits from most significant to least significant, one at a time, until the remaining input modulation symbols of the set of ordered input modulation symbols corresponding to the segment has been processed. The scrambling operation produces 28 ordered scrambled modulation symbols from most significant modulation symbol to least significant modulation symbol (Y27, Y26, Y25, Y24, Y23, Y22, Y21, Y20, Y19, Y18, Y17, Y16, Y15, Y14, Y13, Y12, Y11, Y0, Y9, Y8, Y7, Y6, Y5, Y4, Y3, Y2, Y1, Y0) illustrated by block 1306, which are communicated over the wireless terminal uplink state transition acknowledgment channel segment.

Figure 14:
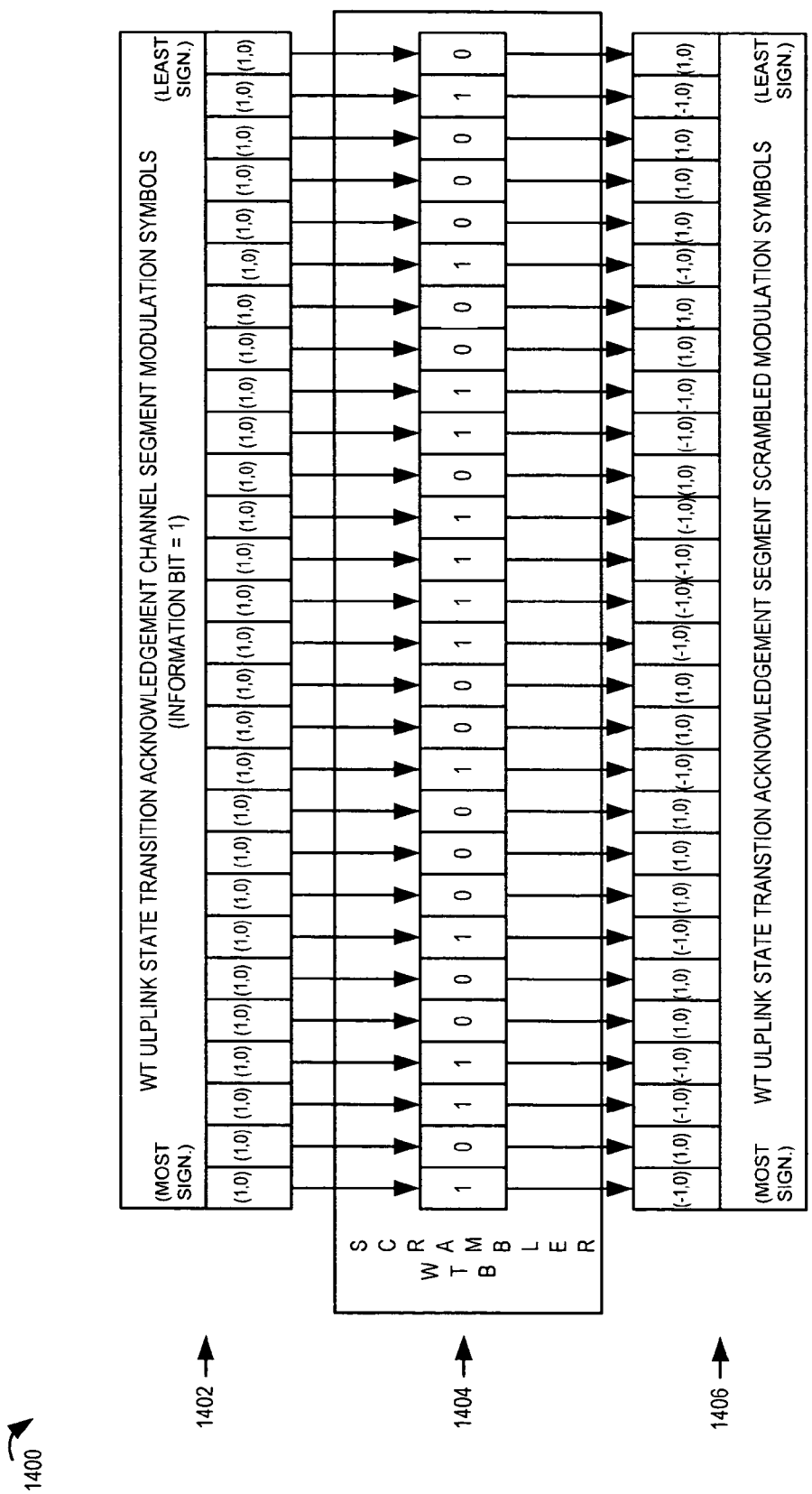
FIG. 14 is a drawing illustrating exemplary modulation symbol scrambling in accordance with various embodiments.

FIG. 14 is a drawing 1400 illustrating exemplary modulation symbol scrambling in accordance with various embodiments. Block 1402 illustrates an exemplary WT uplink state transition acknowledgment channel segment set of 28 ordered modulation symbols, from most to least significant modulation symbol ((1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0), (1,0)) corresponding to a single information bit=1. Block 1402 of FIG. 14 may correspond to block 1302 of FIG. 13. WTB scrambler 1404 uses WT scrambling ID=1011001000100111 to scramble the modulation input modulation symbols of block 1402 and generate an ordered set of scrambled modulation symbols from most significant to least significant ((−1,0), (1,0), (−1,0), (−1,0), (1,0), (1,0), (−1,0), (1,0), (1,0), (1,0), (−1,0), (1,0), (1,0), (1,0), (−1,0), (−1,0), (−1,0), (−1,0), (1,0), (−1,0), (−1,0), (1,0), (1,0), (−1,0), (1,0), (1,0), (1,0), (−1,0), (1,0)). Block 1404 of FIG. 14 may correspond to block 1304 of FIG. 13 using wtScrambling ID of drawing 406 of FIG. 4, while block 1406 of FIG. 14 may correspond to block 1306 of FIG. 13.

Figure 15:
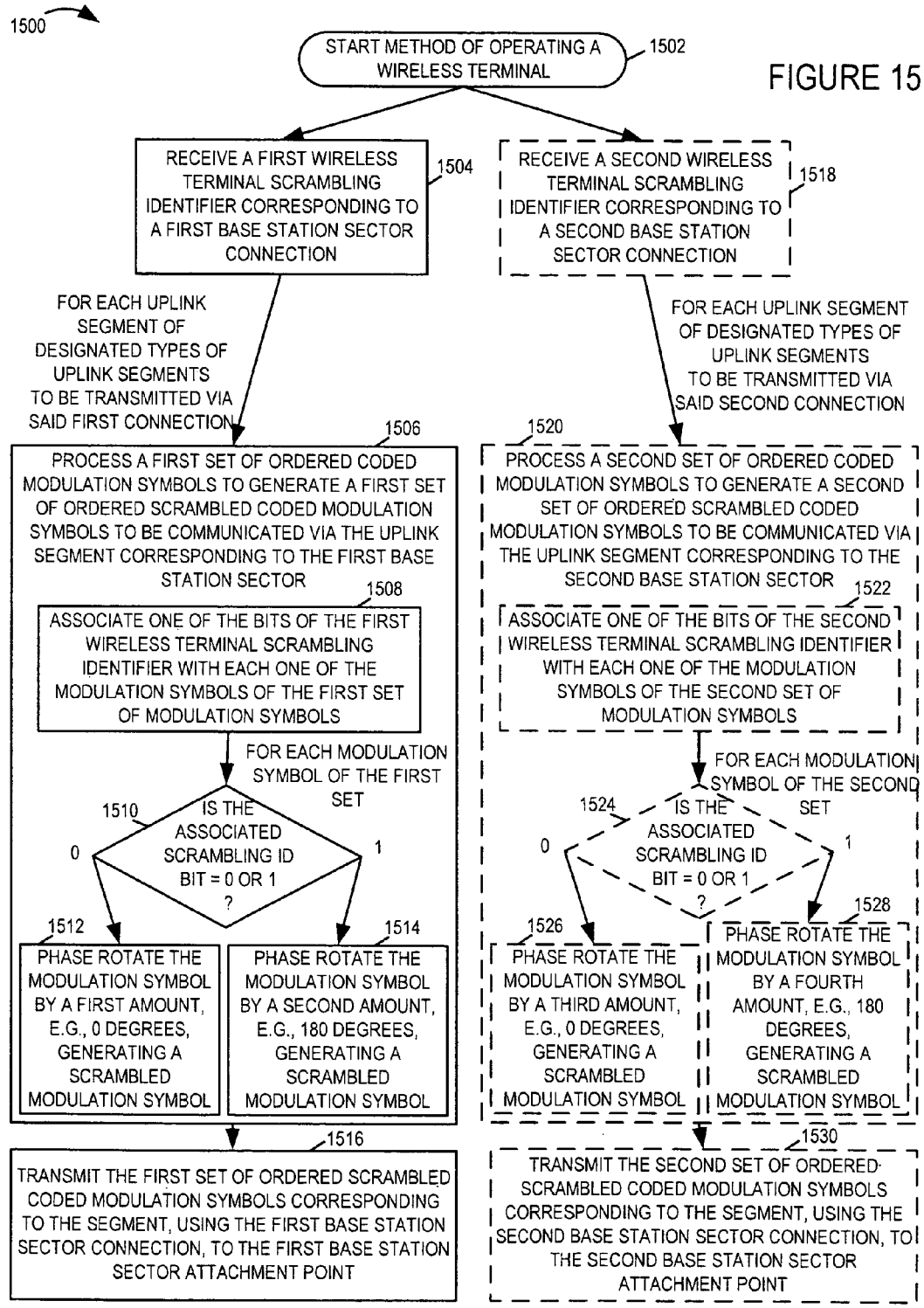
FIG. 15 is a flowchart of an exemplary method of operating a wireless terminal in accordance with various embodiments.

FIG. 15 is a flowchart 1500 of an exemplary method of operating a wireless terminal in accordance with various embodiments. Operation starts in step 1502, where the wireless terminal is powered up and initialized. Operation proceeds from start step 1502 to step 1504. In step 1504, the wireless terminal receives a first wireless terminal scrambling identifier corresponding to a first base station sector connection. In some embodiments, the operation of step 1504 is performed as part of a registration process with a base station sector or as part of a handoff operation from one base station sector attachment point to another base station sector attachment point.

Operation proceeds from step 1504 to step 1506 for each uplink segment of designated types of uplink segments to be transmitted via the first connection. In some embodiments the designated types of uplink segments includes at least one of: (i) an uplink traffic acknowledgment channel segment, (ii) an uplink dedicated control channel segment, (iii) an uplink state request channel segment, and (iv) an uplink state transition acknowledgment channel segment. In some embodiments, the designated types of uplink segments are allocated to the wireless terminal while the wireless terminal is in an active mode of operation, e.g., an active ON state or an active HOLD state of wireless terminal operation.

In step 1506, the wireless terminal processes a first set of ordered coded modulation symbols to generate a first set of ordered scrambled coded modulation symbols to be communicated via the uplink segment corresponding to the first base station sector. In some embodiments, the size of the first set of ordered coded modulation symbols varies as a function of the type of segment. For example, in an exemplary embodiment, a first set of ordered coded modulation symbols for (an uplink traffic acknowledgment segment, an uplink dedicated control channel segment, an uplink state request channel segment, an uplink state transition acknowledgment channel segment) has (28, 21, 14, 28) modulation symbols, respectively. Step 1506 includes sub-steps 1508, 1510, 1512, and 1514.

In sub-step 1508, the wireless terminal associates one of the bits of the first wireless terminal scrambling identifier with each one of the modulation symbols of the first set of modulation symbols. In some embodiments, the association is such that the most significant modulation symbol of the first set is associated with the most significant bit of the wireless terminal scrambling identifier; the next most significant modulation symbol of the first set is associated with the next most significant bit of the wireless terminal scrambling identifier, and so on. This continues until each member of the first set of modulation symbols has been associated with a wireless terminal scrambling identifier bit; if each member of the wireless terminal scrambling identifiers is associated with a modulation symbol of the first set, and there are still remaining modulation symbol of the first set not associated, the association process continues starting with another association of the most significant bit of the wireless terminal scrambling identifier and proceeding successively to the next less significant bit, and so on. Operation proceeds from sub-step 1508 to sub-step 1510 for each modulation symbol of the first set of modulation symbols.

In sub-step 1510, the wireless terminal proceeds depending differently depending upon the value of the associated wireless terminal scrambling ID bit corresponding to the modulation symbol of the first set. If the associated scrambling bit is a 0, then operation proceeds from sub-step 1510 to sub-step 1512; however, if the associated scrambling bit is 1, then operation proceeds from sub-step 1510 to sub-step 1514.

In sub-step 1512, the wireless terminal phase rotates the modulation symbol by a first amount, e.g., 0 degrees, generating a scrambled modulation symbol. In sub-step 1514, the wireless terminal phase rotates the modulation symbol by a second amount, e.g., 180 degrees, generating a scrambled modulation symbol.

Operation proceeds from step 1506 to step 1516. In step 1516, the wireless terminal transmits the first set of ordered scrambled coded modulation symbols corresponding to the segment, using the first base station sector connection, to the first base station sector attachment point.

In some embodiments, the wireless terminal can support multiple connections with base station sectors. In such an embodiment, operation can proceed from start step 1502 to start step 1518 in addition to step 1504. In step 1518, the wireless terminal receives a second wireless terminal scrambling identifier corresponding to a second base station sector. For example, the second base station sector connection may correspond to one of: (i) a base station sector attachment point of a different cell than the first base station sector attachment point, (ii) a base station sector attachment point of the same cell but a different sector as the first base station sector attachment point, and (iii) a base station sector attachment point of the same cell of the same sector as the first base station sector attachment point but using a different tone block, e.g., different set of frequencies and/or carrier.

Operation proceeds from step 1518 to step 1520 for each uplink segment of designated types of uplink segments to be transmitted via the second connection. In step 1520, the wireless terminal processes a second set of ordered coded modulation symbols to generate a second set of ordered scrambled coded modulation symbols to be communicated via the uplink segment corresponding to the second base station sector. Step 1520 includes sub-step 1522, 1524, 1526, and 1528.

In sub-step 1522, the wireless terminal associates one of the bits of the second wireless terminal scrambling identifier with each one of the modulation symbols of the second set of modulation symbols. For each modulation symbol of the second set, operation proceeds from step 1522 to step 1524.

In sub-step 1524, the wireless terminal proceeds depending differently depending upon the value of the associated wireless terminal scrambling ID bit corresponding to the modulation symbol of the second set. If the associated scrambling bit is a 0, then operation proceeds from sub-step 1524 to sub-step 1526; however, if the associated scrambling bit is 1, then operation proceeds from sub-step 1524 to sub-step 1528.

In sub-step 1526, the wireless terminal phase rotates the modulation symbol by a third amount, e.g., 0 degrees, generating a scrambled modulation symbol. In sub-step 1528, the wireless terminal phase rotates the modulation symbol by a fourth amount, e.g., 180 degrees, generating a scrambled modulation symbol.

Operation proceeds from step 1526 or step 1528 to step 1530. In step 1530, the wireless terminal transmits the second set of ordered scrambled coded modulation symbols corresponding to the segment, using the second base station sector connection, to the second base station sector attachment point.

Figure 16:
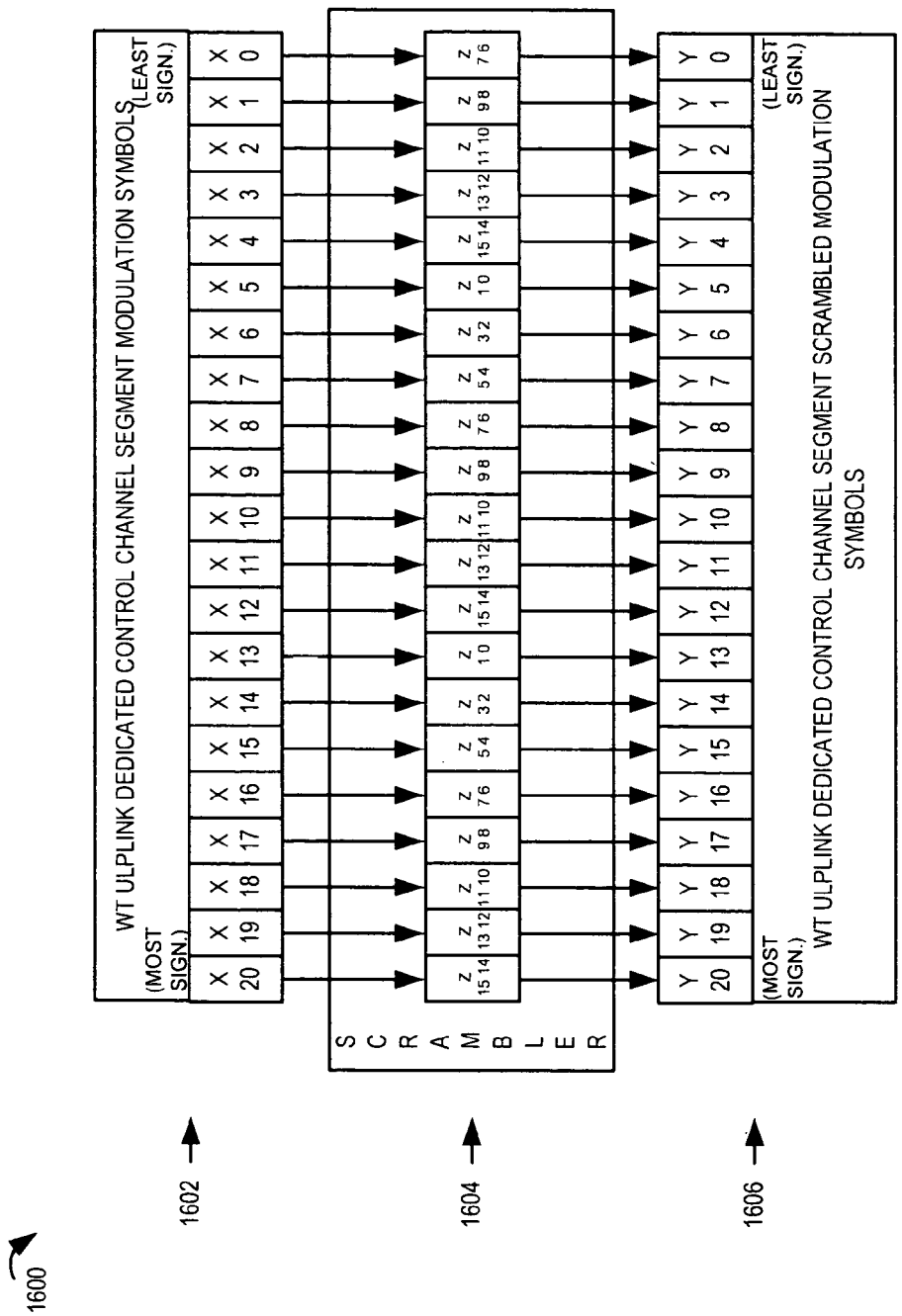
FIG. 16 is a drawing illustrating an exemplary mapping association between pairs of ordered wireless terminal scrambling identification bits with each of the ordered wireless terminal uplink dedicated control channel modulation symbols for an exemplary segment in an exemplary embodiment.

FIG. 16 is a drawing 1600 illustrating an exemplary mapping association between each of a subset of the set of ordered wireless terminal scrambling identification bits with each of the ordered wireless terminal uplink dedicated control channel modulation symbols for an exemplary segment in an exemplary embodiment. Block 1602 shows 21 ordered modulation symbols from most significant modulation symbol to least significant modulation symbol (X20, X19, X18, X17, X16, X15, X14, X13, X12, X11, X10, X9, X8, X7, X6, X5, X4, X3, X2, X1, X0), which are input to scrambler 1604. Scrambler 1604 associates the most significant wireless terminal scrambling ID bit Z15 and the next most significant wireless terminal scrambling ID bit Z14 with the most significant input modulation symbol X20 and scrambles, e.g., phase rotates, modulation symbol X27, as a function of the values of Z15 and Z14 to generate output most significant modulation symbol Y20. This process is repeated for each of the successive lower significant modulation symbol/wireless terminal scrambling ID bit pairs until each the wireless scrambling identifier bits are used. Thus input modulation symbol values (X20, X19, X18, X17, X16, X15, X14, X13) are associated with scrambling ID bits (Z15 and Z14, Z13 and Z12, Z11 and Z10, Z9 and Z8, Z7 and Z6, Z5 and Z4, Z3 and Z2, Z1 and Z0), and a scrambling operation is performed by scrambler 1604 to produce output scrambled modulation symbols (Y20, Y19, Y18, Y17, Y16, Y15, Y14, Y13). The remaining input modulation symbol values (X12, X11, X10, X9, X8, X7, X6, X5, X4, X3, X2, X1, X0) are associated with scrambling ID bits (Z15 and Z14, Z13 and Z12, Z11 and Z10, Z9 and Z8, Z7 and Z6, Z5 and Z4, Z3 and Z2, Z1 and Z0, Z15 and Z14, Z13 and Z12, Z11 and Z10, Z9 and Z8, Z7 and Z6), and a scrambling operation is performed by scrambler 1608 to produce output scrambled modulation symbols (Y12, Y11, Y10, Y9, Y8, Y7, Y6, Y5, Y4, Y3, Y2, Y1, Y0), respectively. As shown, when processing the ordered input modulation symbols of the segment from most significant to least significant the wireless terminal scrambling ID bits are used, two at a time, from most significant to least significant until each of the ordered scrambling ID bits has been used. Then, the wireless terminal starts reusing the scrambling ID bits from most significant to least significant, two at a time. This process is repeated until there are no more input modulation symbols to be associated with wireless terminal scrambling ID bit pairs. The scrambling operation produces 21 ordered scrambled modulation symbols from most significant modulation symbol to least significant modulation symbol (Y20, Y19, Y18, Y17, Y16, Y15, Y14, Y13, Y12, Y11, Y0, Y9, Y8, Y7, Y6, Y5, Y4, Y3, Y2, Y1, Y0) illustrated by block 1606, which are communicated over the wireless terminal uplink dedicated control channel segment.

Figure 17:
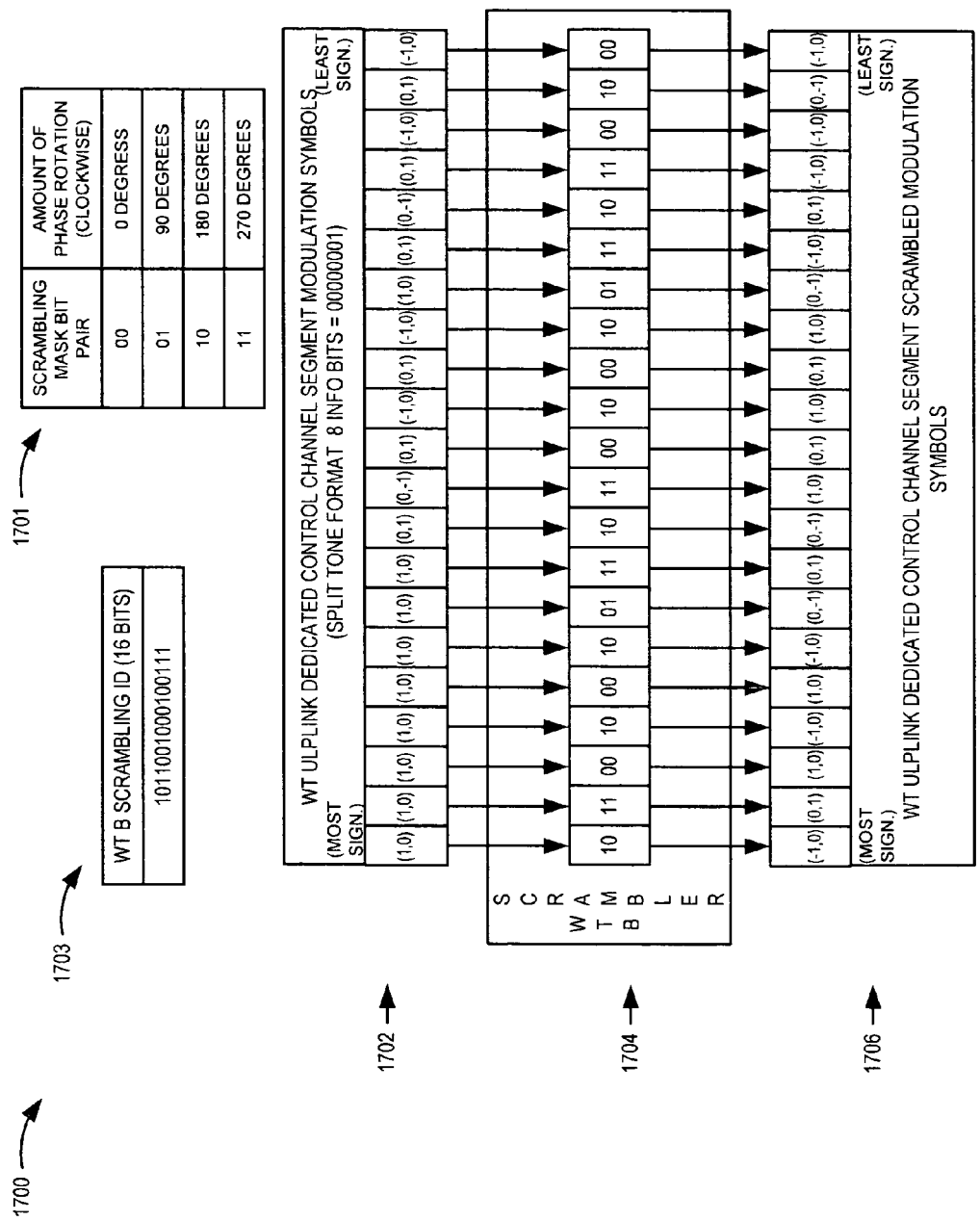
FIG. 17 is a drawing illustrating exemplary modulation symbol scrambling utilizing two wireless terminal scrambling identifier bits per input modulation symbol in accordance with various embodiments.

FIG. 17 is a drawing 1700 illustrating exemplary modulation symbol scrambling in accordance with various embodiments. In this exemplary embodiment each input modulation symbol is scrambled as a function of 2 bits in a wireless terminal scrambling identifier. Table 1701 indicates each of the four possibilities for the two scrambling mask bits (00, 01, 10, 11) and the corresponding amount of phase rotation to be applied by the scrambler in the clockwise direction (0 degrees, 90 degrees, 180 degrees, 270 degrees), respectively. Block 1702 illustrates an exemplary WT uplink dedicated control channel segment set of 21 ordered modulation symbols, from most to least significant modulation symbol ((1,0), (1,0), (1,0), (1,0), (1,0), (1,0), (1,0), (1,0), (0,1), (0,−1), (0,1), (−1,0), (0,1), (−1,0), (1,0), (0,1), (0,−1), (0,1), (−1,0), (0,1), (−1,0)) corresponding to eight ordered information bit=00000001 in split-tone format. WTB scrambler 1704 uses the 16 bit WT B Scrambling ID (WT scrambling ID=1011001000100111) to scramble the modulation input modulation symbols of block 1702 and generate an ordered set of scrambled modulation symbols from most significant to least significant ((−1,0), (0,1), (1,0), (−1,0), (1,0), (−1,0), (0,−1), (0,1), (0,−1), (1,0), (0,1), (1,0), (0,1), (1,0), (0,−1), (−1,0), (0,1), (−1,0), (−1,0), (0,−1), (−1,0)). Block 1702 may correspond to block 1602 of FIG. 16; block 1704 may correspond to block 1604 of FIG. 16 using WT B scrambling ID 1701; block 1706 may correspond to block 1606 of FIG. 16.

Individual modulation symbol scrambling performed on multiple modulation symbols within a segment being scrambled can be performed serially and/or in parallel, e.g., depending upon the particular implementation. Similarly, individual modulation symbol unscrambling performs on multiple received modulation symbols corresponding to a segment can be performed serially and/or in parallel, e.g., depending upon the particular implementation.

Figures 18, 18A:
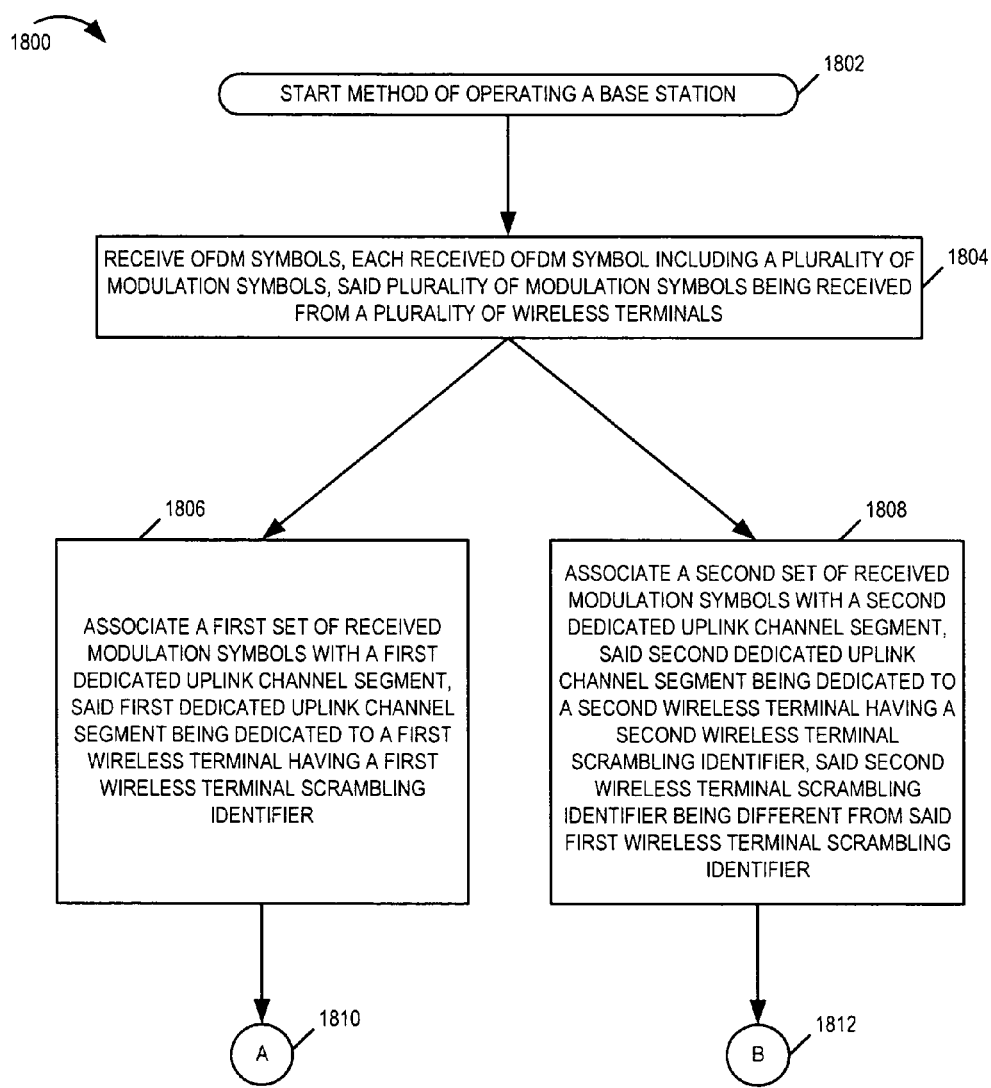
FIG. 18 is a flowchart of an exemplary method of operating a base station in accordance with various embodiments.
Figure 18B:
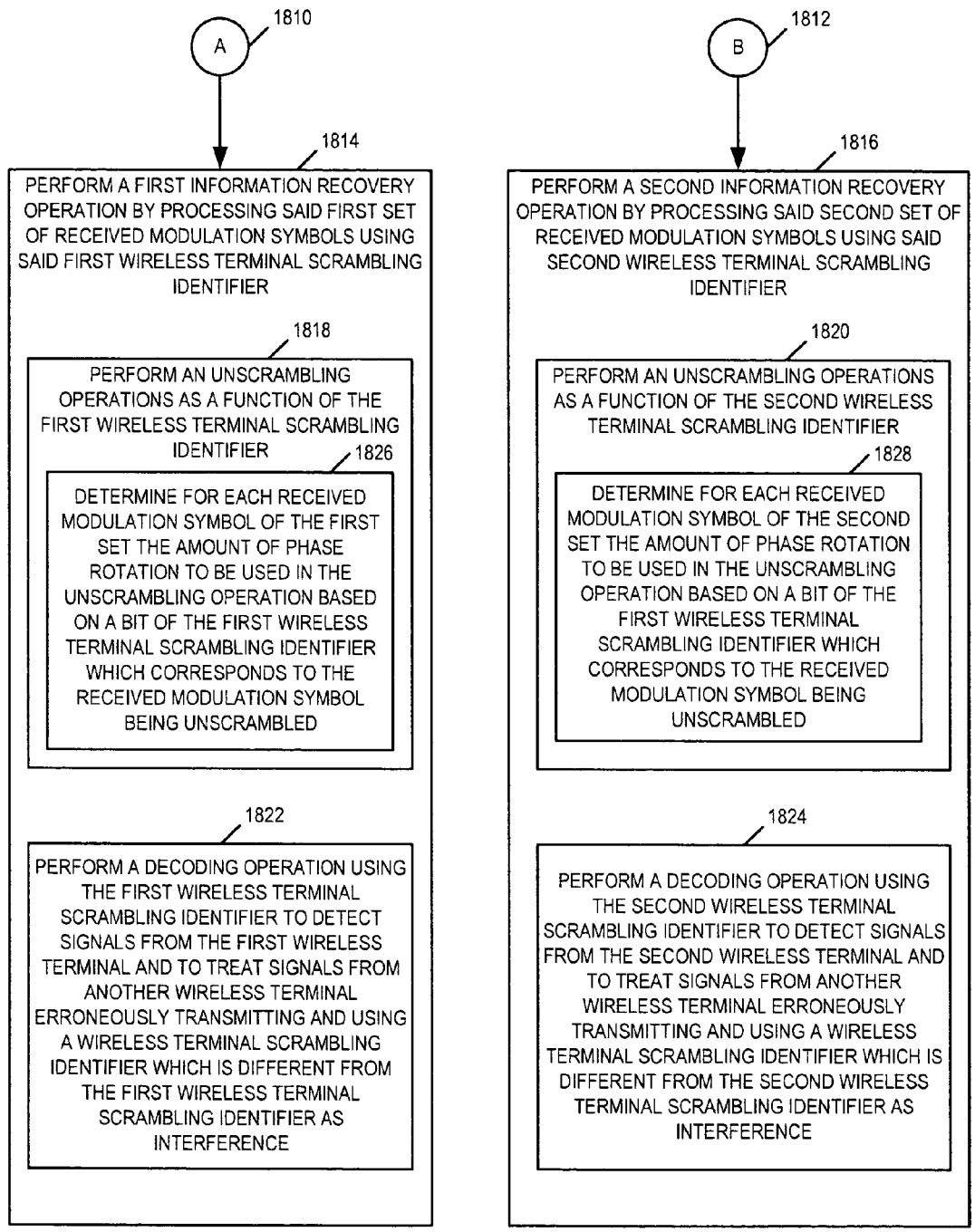

FIG. 18 is a flowchart of an exemplary method of operating a base station in accordance with various embodiments. The exemplary method starts in step 1802, where the base station is powered on and initialized. In start step 1802, the base station allocates dedicated uplink channel segments to a plurality of wireless terminals. Operation proceeds from start step 1802 to step 1804.

In step 1804, the base station receives OFDM symbols, each received OFDM symbol including a plurality of modulation symbol being received from a plurality of wireless terminals. During some times, some of the received modulation symbols include superposed signals from two different wireless terminals, one of the two different wireless terminals being a wireless terminal which is correctly transmitting into a dedicated uplink segment and the other one of the two different wireless terminals being a wireless terminal which is erroneously transmitting into the same dedicated uplink segment. Operation proceeds from step 1804 to step 1806 and step 1808.

In step 1806, the base station associates a first set of received modulation symbols with a first dedicated uplink channel segment, said first dedicated uplink channel segment being dedicated to a first wireless terminal having a first wireless terminal scrambling identifier. Operation proceeds from step 1806 via connecting node A 1810 to step 1814.

In step 1808, the base station associates a second set of received modulation symbols with a second dedicated uplink channel segment, said second dedicated uplink channel segment being dedicated to a second wireless terminal having a second wireless terminal scrambling identifier. Operation proceeds from step 1808 via connecting node B 1812 to step 1816.

The first dedicated uplink channel segment is one of an uplink traffic acknowledgement channel segment, an uplink dedicated control channel segment, an uplink state request channel segment and an uplink state transition acknowledgement channel segment. The second dedicated uplink channel segment is one of an uplink traffic acknowledgement channel segment, an uplink dedicated control channel segment, an uplink state request channel segment and an uplink state transition acknowledgement channel segment. The number of modulation symbols for each of different types of dedicated uplink channel segments which utilize wireless terminal scrambling identifier modulation symbol scrambling can have different numbers of modulation symbols per segment. For example, in one exemplary embodiment an uplink traffic acknowledgment channel segment conveys 28 modulation symbols, an uplink dedicated control channel segment conveys 21 modulation symbols, an uplink state request channel segment conveys 14 modulation symbols and the uplink state transition acknowledgement channel segment conveys 28 modulation symbols. In addition, some uplink dedicated channel segments which use wireless terminal scrambling identifier modulation symbol scrambling include air link resources, e.g., tone-symbols, spread over a plurality of OFDM symbol transmission time intervals and/or use a plurality of tones. For example, a dedicated control channel segment, in one embodiment, uses 21 OFDM tone-symbols, sub-divided into three sets of seven OFDM tone-symbols per set, and the physical tone used for each set of seven may be different in accordance with uplink tone hopping information.

In step 1814, the base station performs a first information recovery operation by processing said first set of received modulation symbols using said first wireless terminal scrambling identifier. Step 1814 includes sub-step 1818 and 1822. In sub-step 1818, the wireless terminal performs unscrambling operations as a function of the first wireless terminal scrambling identifier. Sub-step 1818 includes sub-step 1826. In sub-step 1826, the wireless terminal determines for each received modulation symbol of the first set the amount of phase rotation to be used in the unscrambling operation based on a bit of the first wireless terminal scrambling identifier which corresponds to the received modulation symbol being unscrambled. In some embodiments, if the corresponding bit of the first wireless terminal scrambling identifier has a value of 0, then 0 degrees of phase rotation is applied to the received modulation symbol being unscrambled, while if the corresponding bit of the first wireless terminal scrambling identifier has a value of 1, then 180 degrees of phase rotation is applied to the received modulation symbol being unscrambled. In step 1822, the base station performs a decoding operation using the first wireless terminal scrambling identifier to detect signals from the first wireless terminal and to treat signals from another wireless terminal as interference, said another wireless terminal erroneously transmitting into the air link resources of the first dedicated uplink channel segment and using a wireless terminal scrambling identifier which is different from the first wireless terminal scrambling identifier.

In step 1816, the base station performs a second information recovery operation by processing said second set of received modulation symbols using said second wireless terminal scrambling identifier. Step 1816 includes sub-step 1820 and 1824. In sub-step 1820, the wireless terminal performs unscrambling operations as a function of the second wireless terminal scrambling identifier. Sub-step 1820 includes sub-step 1828. In sub-step 1828, the wireless terminal determines for each received modulation symbol of the second set the amount of phase rotation to be used in the unscrambling operation based on a bit of the second wireless terminal scrambling identifier which corresponds to the received modulation symbol being unscrambled. In some embodiments, if the corresponding bit of the second wireless terminal scrambling identifier has a value of 0, then 0 degrees of phase rotation is applied to the received modulation symbol being unscrambled, while if the corresponding bit of the second wireless terminal scrambling identifier has a value of 1, then 180 degrees of phase rotation is applied to the received modulation symbol being unscrambled. In step 1824, the base station performs a decoding operation using the second wireless terminal scrambling identifier to detect signals from the second wireless terminal and to treat signals from another wireless terminal as interference, said another wireless terminal erroneously transmitting into the air link resources of the second dedicated uplink channel segment and using a wireless terminal scrambling identifier which is different from the second wireless terminal scrambling identifier.

Figure 19:
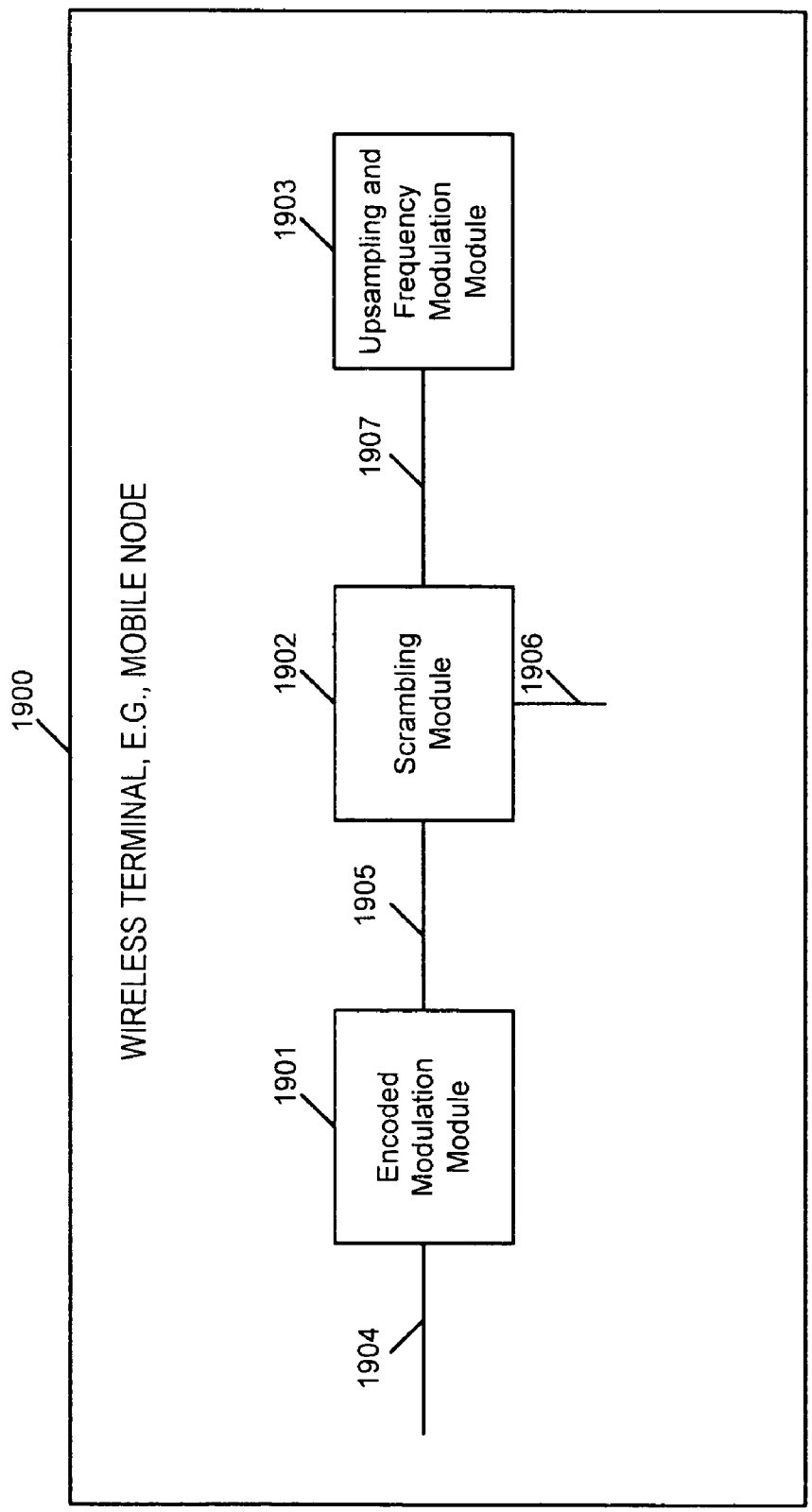
FIG. 19 is a drawing of an exemplary wireless terminal, implemented in accordance with various embodiments, illustrating exemplary modules and signal flow.

FIG. 19 is a drawing of an exemplary wireless terminal 1900, implemented in accordance with various embodiments, illustrating exemplary modules and signal flow. Wireless terminal 1900 includes an encoded modulation module 1901, a scrambling module 1902, and an upsampling and frequency modulation module 1903. Encoded modulation module 1901 receives input information bits to be communicated 1904 and outputs modulation symbols 1905, e.g., sets of indexed modulations symbols corresponding to segments. Scrambling module 1902, uses control information 1906 such as a wireless terminal scrambling identifier associated with the wireless terminal and information relating bits of the wireless terminal scrambling identifier to indexed modulation symbols in segments to generate scrambled, e.g., phase rotated, modulation symbols 1907. The scrambling module 1902 performs scrambling on a per modulation symbol basis. The scrambling module performs scrambling for a predetermined types of dedicated uplink channel segments, e.g., uplink traffic acknowledgement channel segments, uplink dedicated control channel segments, uplink state transition request segments, and uplink state transition request acknowledgement segments. The scrambled modulation symbols 1907 are processed by the upsampling and frequency modulation module 1903, e.g., resulting in uplink signals which are transmitted over the airlink by the wireless terminal.

Exemplary wireless terminal 1900 may be the exemplary wireless terminal 300 of FIG. 3, e.g., with encoded modulation module 1901 being another one of modules included in the wireless terminal's control routines 324, scrambling module 1902 corresponding to scrambling module 330, and upsampling and frequency modulation module 1903 being included as part of transmission module 304.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus of various embodiments, are applicable to a wide range of communications systems including many non-OFDM and/or non-cellular systems.

Numerous additional variations on the methods and apparatus of various embodiments described above will be apparent to those skilled in the art in view of the above description. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A communications method comprising:
scrambling a plurality of modulation symbols as a function of a wireless terminal identifier to produce scrambled modulation symbols, said scrambling including subjecting at least a first N of said plurality of modulation symbols, on a symbol by symbol basis, to a phase rotation operation wherein each phase rotation is by an amount which is one of a plurality of different amounts, the amount of rotation applied to a particular one of the N modulation symbols being determined by said wireless terminal identifier, where N is a positive integer; and
transmitting said scrambled modulation symbols.

2. The method of claim 1, wherein said plurality of different amounts is $2^N$.

3. The method of claim 2, wherein N is one.

4. The method of claim 3, wherein zero and 180 degrees are the different amounts of phase rotation.

5. The method of claim 1, wherein
the phase rotation applied to individual ones of the N symbols being one of a first amount and a second amount, the amount of phase rotation applied to any particular one of the N symbols being determined by one of N bits included in said wireless terminal identifier corresponding to the particular one of the N symbols.

6. The method of claim 5, wherein said wireless terminal identifier is an N bit identifier.

7. The method of claim 6, wherein each bit of the N bit identifier corresponds to a different one of the first N of the plurality of modulation symbols.

8. The method of claim 5, wherein said scrambling further includes:
subjecting at least X additional ones of the plurality of modulation symbols on a symbol by symbol basis to a phase rotation operation wherein the phase rotation is one of the first amount and the second amount determined by a corresponding bit in said wireless terminal identifier, where X is a positive integer.

9. The method of claim 8, wherein X is 12;
wherein N is equal to 16; and
wherein said plurality of modulation symbols convey an uplink information bit which is an acknowledgment signal.

10. The method of claim 8, wherein X is 5;
wherein N is equal to 16; and
wherein said plurality of modulation symbols convey 6 or 8 information bits of a dedicated control channel segment.

11. The method of claim 8, wherein said phase rotation operation is one of a phase shift of zero and 180 degrees.

12. The method of claim 5, wherein the first N of the plurality of modulation symbols is the plurality of modulation symbols;
wherein the wireless terminal identifier is a K bit identifier;
wherein K is a positive integer less than or equal to N; and
wherein each of the N modulation symbols corresponds to a different one of the bits of the K bit identifier.

13. The method of claim 12, wherein N is 14;
wherein K is 16; and
wherein said plurality of modulation symbols convey a two information bit uplink state request.

14. The method of claim 5, wherein said scrambling and transmitting are performed by a wireless terminal; and
wherein said transmitting includes using OFDM tones to communicate said scrambled modulation symbols.

15. The method of claim 5, wherein said plurality of modulation symbols are indexed according to a predetermined modulation symbol to channel segment mapping arrangement;
wherein the bits in said wireless terminal identifier are indexed; and
wherein the plurality of modulation symbols is M modulation symbols, the wireless terminal identifier is a K bit identifier, where K and M are positive integers, M being greater than or equal to K, and where each different indexed bit of the K bit wireless terminal identifier corresponds to at most ceiling (M/K) different modulation symbols of the M modulation symbols.

16. The method of claim 5 wherein said wireless terminal identifier is a 16 bit wtScramblingID.

17. The method of claim 1, wherein said scrambling is applied to encoded modulation symbols used to communicate an uplink traffic acknowledgement signal.

18. The method of claim 1, wherein said scrambling is used for at least one of an uplink dedicated control channel, an uplink traffic acknowledgement channel, and an uplink state transition acknowledgement channel, and an uplink state request channel.

19. The method of claim 1, wherein scrambling a plurality of modulation symbols as a function of a wireless terminal identifier to produce scrambled modulation symbols includes:
determining the amount of rotation applied to different ones of the N modulation symbols from different portions of said wireless terminal identifier, said second bit being a different bit than said first bit.

20. The method of claim 19, wherein determining the amount of rotation applied to different ones of the N modulation symbols includes:
   determining the amount of phase rotation applied to a first one of the N modulation symbols from a first bit of said wireless terminal identifier; and
   determining the amount of phase rotation applied to a second one of the N modulation symbols from a second bit of said wireless terminal identifier.

21. The method of claim 1, wherein said wireless terminal identifier is a wireless terminal scrambling identifier, the method further comprising:
   receiving a first wireless terminal scrambling identifier corresponding to a first connection with a base station;
   using said first wireless terminal scrambling identifier as said wireless terminal identifier;
   receiving a second wireless terminal scrambling identifier corresponding to a second connection with said base station connection; and
   performing a scrambling operation as a function of said second wireless terminal scrambling identifier when communicating over said second connection with said base station.

22. The method of claim 1, wherein said wireless terminal identifier is a wireless terminal scrambling identifier of a cell; and
   wherein different wireless terminal connections in said cell corresponding to a sector of said cell have different wireless terminal scrambling identifiers.

23. A wireless terminal comprising:
   a scrambling module for scrambling a plurality of modulation symbols as a function of a wireless terminal identifier to produce scrambled modulation symbols, said scrambling module including a phase rotation module for subjecting at least a first N of said plurality of modulation symbols, on a symbol by symbol basis, to a phase rotation operation wherein each phase rotation is by an amount which is one of a plurality of different amounts, the amount of rotation applied to a particular one of the N modulation symbols being determined by said wireless terminal identifier, where N is a positive integer; and
   a transmission module for transmitting said scrambled modulation symbols.

24. The wireless terminal of claim 23, wherein said plurality of different amounts is $2^N$.

25. The wireless terminal of claim 24, wherein N is one.

26. The wireless terminal of claim 25, wherein zero and 180 degrees are the different amounts of phase rotation.

27. The wireless terminal of claim 23, wherein said phase rotation applied to individual ones of the N symbols being one of a first amount and a second amount, the amount of phase rotation applied to any particular one of the N symbols being determined by one of N bits included in said wireless terminal identifier corresponding to the particular one of the N symbols.

28. The wireless terminal of claim 27, wherein said wireless terminal identifier is a K bit identifier, where K is a positive integer.

29. The wireless terminal of claim 28, wherein N=K.

30. The wireless terminal of claim 27, wherein said scrambling module further includes:
   means for subjecting at least X additional ones of the plurality of modulation symbols on a symbol by symbol basis to a phase rotation operation wherein the phase rotation is one of the first and the second amount determined by a corresponding bit in said wireless terminal identifier, where X is a positive integer.

31. The wireless terminal of claim 27, further comprising:
   stored uplink segment structure information identifying the number of indexed modulation symbols associated with different types of uplink segments to which modulation symbol scrambling is to be applied.

32. The wireless terminal of claim 27, further comprising:
   corresponding bit identification information associating indexed modulation symbol positions within a segment to indexed wireless terminal identifier bits.

33. The wireless terminal of claim 31, wherein the different types of uplink segments include different numbers of modulation symbols.

34. The wireless terminal of claim 31, wherein the different types of uplink segments include at least two of an uplink traffic channel acknowledgement segment, an uplink dedicated control channel segment, an uplink state request channel segment, and an uplink state transition acknowledgment channel segment.

35. The wireless terminal of claim 27, wherein said wireless terminal identifier is a first scrambling identifier associated with a first active user identifier, said first active user identifier corresponding to a first base station sector attachment point.

36. The wireless terminal of claim 35, further comprising:
   a stored second scrambling identifier associated with a second active user identifier, the second scrambling identifier being different than the first scrambling identifier, the second active user identifier corresponding to a second base station sector attachment point, said second base station sector attachment point being different from said first base station sector attachment point.

37. The wireless terminal of claim 27, further comprising:
   an OFDM receiver for receiving scrambled downlink modulation symbols directed exclusively to the wireless terminal which have been scrambled independent of the wireless terminal identifier.

38. The wireless terminal of claim 37, further comprising:
   a downlink unscrambling module for unscrambling said received scrambled downlink modulation symbols as a function base sector parameter information corresponding to a base station sector attachment point.

39. The wireless terminal of claim 27, further comprising:
   a scrambling bypass module for bypassing modulation symbol scrambling operations on modulation symbols corresponding to at least some uplink segments.

40. The wireless terminal of claim 39, wherein the at least some uplink segments include at least one of an uplink access exchange channel segment, and uplink access signal timing control channel segment, and an uplink access signal power control channel segment.

41. A non-transitory computer readable medium embodying machine executable instructions for controlling a communications device to implement a communications method, the method comprising:
   scrambling a plurality of modulation symbols as a function of a wireless terminal identifier to produce scrambled modulation symbols, said scrambling including subjecting at least a first N of said plurality of modulation symbols, on a symbol by symbol basis, to a phase rotation operation wherein each phase rotation is by an amount which is one of a plurality of different amounts as part of said scrambling, the amount of rotation applied to a particular one of the N modulation symbols being determined by said wireless terminal identifier, where N is a positive integer; and
   transmitting said scrambled modulation symbols.

42. The non-transitory computer readable medium of claim 41, wherein said plurality of different amounts is $2^N$.

43. The non-transitory computer readable medium of claim 42, wherein N is one.

44. The non-transitory computer readable medium of claim 43, wherein zero and 180 degrees are the different amounts of phase rotation.

45. The non-transitory computer readable medium of claim 41, wherein the phase rotation applied to individual ones of the N symbols being one of a first amount and a second amount, the amount of phase rotation applied to any particular one of the N symbols being determined by one of N bits included in said wireless terminal identifier corresponding to the particular one of the N symbols.

46. A communications device comprising:

means for scrambling a plurality of modulation symbols as a function of a wireless terminal identifier to produce scrambled modulation symbols, said means for scrambling including means for subjecting at least a first N of said plurality of modulation symbols, on a symbol by symbol basis, to a phase rotation operation wherein each phase rotation is by an amount which is one of a plurality of different amounts, the amount of rotation applied to a particular one of the N modulation symbols being determined by said wireless terminal identifier where N is a positive integer; and means for transmitting said scrambled modulation symbols.

47. The communications device of claim 46, wherein the phase rotation applied to individual ones of the N symbols being one of a first amount and a second amount, the amount of phase rotation applied to any particular one of the N symbols being determined by one of N bits included in said wireless terminal identifier corresponding to the particular one of the N symbols.

48. The communications device of claim 47, wherein said plurality of modulation symbols are indexed according to a predetermined modulation symbol to channel segment mapping arrangement;

wherein the bits in said wireless terminal identifier are indexed; and wherein the plurality of modulation symbols is M modulation symbols, the wireless terminal identifier is a K bit identifier, where K and M are positive integers, M being greater than or equal to K, and where each different indexed bit of the K bit wireless terminal identifier corresponds to at most ceiling (M/K) different modulation symbols of the M modulation symbols.

49. The communications apparatus of claim 47, wherein different types of uplink segments to which said scrambling a plurality of modulation symbols as a function of a wireless terminal identifier is applied include at least two of an uplink traffic channel acknowledgement segment, an uplink dedicated control channel segment, an uplink state request channel segment, and an uplink state transition acknowledgment channel segment.

50. An apparatus operable in a communication system, the apparatus comprising:

a processor configured to:
scramble a plurality of modulation symbols as a function of a wireless terminal identifier to produce scrambled modulation symbol, said scrambling including subjecting at least a first N of said plurality of modulation symbols, on a symbol by symbol basis, to a phase rotation operation, as part of said scramble operation, wherein each phase rotation is by an amount which is one of a plurality of different amounts, the amount of rotation applied to a particular one of the N modulation symbols being determined by said wireless terminal identifier, where N is a positive integer; and
transmit said scrambled modulation symbols.

51. The apparatus of claim 50, wherein said processor is configured such that said plurality of different amounts is $2^N$.

* * * * *